United States Patent
Peruch et al.

(10) Patent No.: US 11,720,766 B2
(45) Date of Patent: Aug. 8, 2023

(54) SYSTEMS AND METHODS FOR TEXT AND BARCODE READING UNDER PERSPECTIVE DISTORTION

(71) Applicant: PACKSIZE LLC, Salt Lake City, UT (US)

(72) Inventors: Francesco Peruch, Sunnyvale, CA (US); Carlo Dal Mutto, Sunnyvale, CA (US); Jason Trachewsky, Menlo Park, CA (US)

(73) Assignee: PACKSIZE LLC, Salt Lake City, UT (US)

( * ) Notice: Subject to any disclaimer, the term of this patent is extended or adjusted under 35 U.S.C. 154(b) by 680 days.

(21) Appl. No.: 16/730,920

(22) Filed: Dec. 30, 2019

(65) Prior Publication Data
US 2020/0380229 A1 Dec. 3, 2020

Related U.S. Application Data

(60) Provisional application No. 62/786,303, filed on Dec. 28, 2018.

(51) Int. Cl.
| | |
|---|---|
| *G06K 9/00* | (2022.01) |
| *G06K 9/36* | (2006.01) |
| *G06K 9/32* | (2006.01) |
| *G06K 7/14* | (2006.01) |
| *G06T 7/593* | (2017.01) |
| *G06T 7/521* | (2017.01) |

(52) U.S. Cl.
CPC ......... *G06K 7/1447* (2013.01); *G06K 7/1417* (2013.01); *G06K 7/1443* (2013.01); *G06T 7/521* (2017.01); *G06T 7/593* (2017.01)

(58) Field of Classification Search
None
See application file for complete search history.

(56) References Cited

U.S. PATENT DOCUMENTS

| | | | | |
|---|---|---|---|---|
| 8,971,666 | B2 * | 3/2015 | Yu | G06T 5/006 |
| | | | | 382/293 |
| 9,583,140 | B1 * | 2/2017 | Rady | H04N 21/44004 |
| 9,898,856 | B2 * | 2/2018 | Yang | G06T 5/006 |
| 10,373,299 | B1 * | 8/2019 | Holub | G06T 1/0071 |
| 11,030,763 | B1 * | 6/2021 | Srivastava | G06T 7/38 |
| 11,471,221 | B2 * | 10/2022 | Zhao | A61B 34/30 |
| 2008/0035390 | A1 * | 2/2008 | Wurz | G01G 11/00 |
| | | | | 702/156 |

(Continued)

OTHER PUBLICATIONS

International Search Report and Written Opinion received for PCT Patent Application No. PCT/US19/069006, dated Dec. 4, 2019, 16 pages.

*Primary Examiner* — Avinash Yentrapati
(74) *Attorney, Agent, or Firm* — Workman Nydegger

(57) ABSTRACT

A method for automatically recognizing content of labels on objects includes: capturing visual information of an object using a scanning system including one or more cameras, the object having one or more labels on one or more exterior surfaces; detecting, by a computing system, one or more surfaces of the object having labels; rectifying, by the computing system, the visual information of the one or more surfaces of the object to compute one or more rectified images; and decoding, by the computing system, content of a label depicted in at least one of the one or more rectified images.

20 Claims, 8 Drawing Sheets

(56) References Cited

U.S. PATENT DOCUMENTS

| | | | |
|---|---|---|---|
| 2009/0001165 A1* | 1/2009 | Zhang | G06T 3/608 235/462.11 |
| 2010/0168562 A1* | 7/2010 | Zhao | A61B 90/94 600/426 |
| 2010/0217678 A1* | 8/2010 | Goncalves | G07G 1/0063 382/209 |
| 2013/0293468 A1 | 11/2013 | Perez et al. | |
| 2015/0062369 A1* | 3/2015 | Gehring | G06K 7/146 348/222.1 |
| 2015/0310601 A1* | 10/2015 | Rodriguez | G06T 1/005 348/150 |
| 2015/0358602 A1* | 12/2015 | Mayumi | H04N 23/56 348/46 |
| 2016/0142673 A1* | 5/2016 | Rao | G06V 40/19 348/14.08 |
| 2017/0014029 A1* | 1/2017 | Azizian | A61B 5/0071 |
| 2017/0124687 A1* | 5/2017 | McCloskey | G06K 7/10722 |
| 2017/0300734 A1* | 10/2017 | Zheng | G06K 19/06037 |
| 2018/0032832 A1* | 2/2018 | Shen | H04N 1/00562 |
| 2018/0137685 A1 | 5/2018 | Montgomerie et al. | |
| 2018/0174364 A1 | 6/2018 | Copic et al. | |
| 2018/0197139 A1* | 7/2018 | Hill | H04N 25/67 |
| 2018/0204381 A1* | 7/2018 | Kanatsu | G06T 7/248 |
| 2018/0283876 A1* | 10/2018 | Cregan | G06F 3/0484 |
| 2018/0314867 A1* | 11/2018 | Kotula | G06T 7/0002 |
| 2019/0102868 A1* | 4/2019 | Beric | G06T 5/006 |
| 2019/0188435 A1* | 6/2019 | Davis | G06V 10/147 |
| 2019/0188513 A1* | 6/2019 | Beghtol | G06F 3/03 |
| 2019/0287226 A1* | 9/2019 | Holub | G06K 7/1443 |
| 2020/0143524 A1* | 5/2020 | Selstad | G06T 3/0093 |
| 2020/0368616 A1* | 11/2020 | Delamont | G06F 3/011 |
| 2021/0157998 A1* | 5/2021 | Rodriguez | G07G 1/0054 |

\* cited by examiner

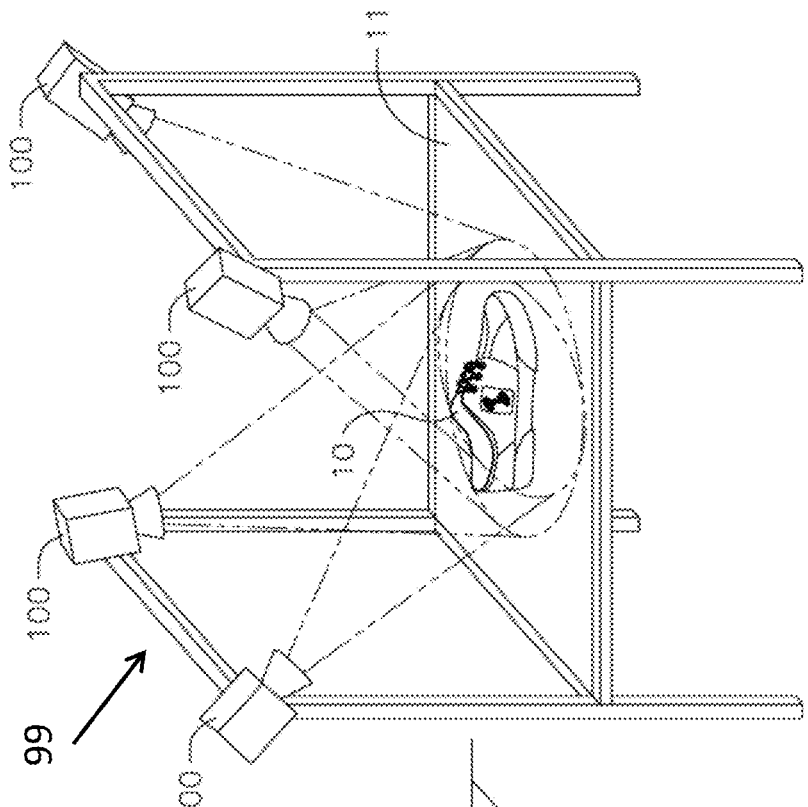
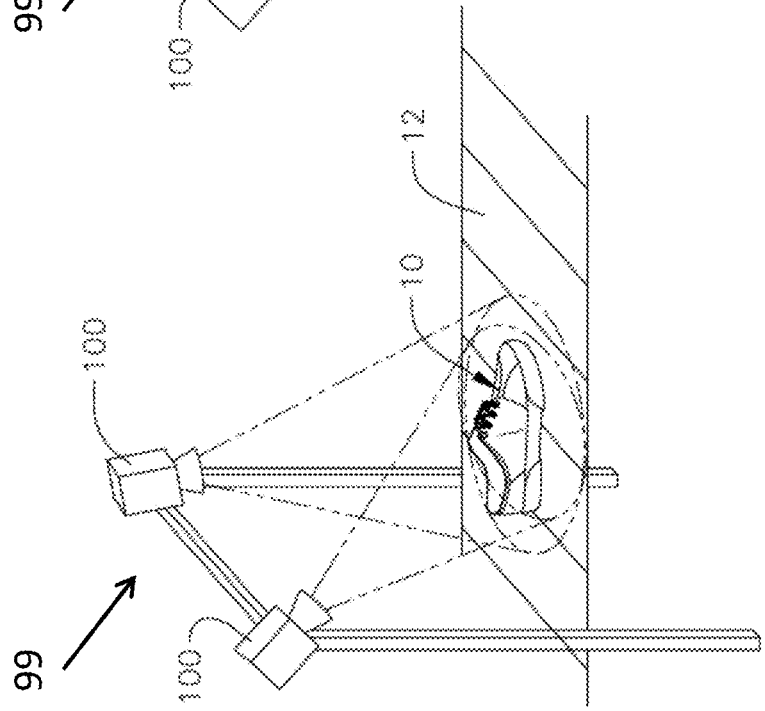
FIG. 5B
FIG. 5A

SYSTEMS AND METHODS FOR TEXT AND BARCODE READING UNDER PERSPECTIVE DISTORTION

CROSS-REFERENCE TO RELATED APPLICATION(S)

This application claims the benefit of U.S. Provisional Patent Application No. 62/786,303, filed in the United States Patent and Trademark Office on Dec. 28, 2018, the entire disclosure of which is incorporated by reference herein.

FIELD

Aspects of embodiments of the present invention relate to the field of computer vision, including techniques for text and barcode reading under perspective distortion.

BACKGROUND

Modern optical character recognition (OCR) systems and barcode readers have high accuracy, due in part to modern image processing and machine learning techniques. Traditionally, OCR was developed and used in the recognition of text in images of documents acquired using flatbed scanners, resulting in well-framed images. Fixed barcode readers (e.g., at supermarket checkout registers) are normally used for small items that can be correctly positioned and oriented in front of the scanner (to align the barcode reader with the orientation of the bar codes), and hand-held barcode readers can be positioned in front of barcodes for larger, less easily manipulated items.

More recently, OCR and barcode reading technologies have found new application domains that demand improved capabilities. For instance, OCR and barcode readers may often be used in the context of large warehouses of logistics services, which frequently used fixed readers to read labels attached to boxes of various sizes. These labels may indicate important properties of the boxes, for example, how these packages need to be handled. Given the high level of automation of modern distribution centers, there is a demand for systems that can reliably read the content of any labels that may be affixed to a package or printed on its surface, whether the information is encoded as text, iconography, and/or barcodes.

SUMMARY

Aspects of embodiments of the present invention relate to systems and methods for detecting and decoding labels on exterior visible surfaces of an object.

According to one embodiment of the present invention, a method for automatically recognizing content of labels on objects includes: capturing visual information of an object using a scanning system including one or more cameras, the object having one or more labels on one or more exterior surfaces; detecting, by a computing system, one or more surfaces of the object having labels; rectifying, by the computing system, the visual information of the one or more surfaces of the object to compute one or more rectified images; and decoding, by the computing system, content of a label depicted in at least one of the one or more rectified images.

The label may include a barcode, and the decoding the content of the label may include supplying the rectified image of the label to a barcode recognition algorithm. The barcode may be a linear barcode. The barcode may be a 2-D bar code.

The label may include text, and the decoding the content of the label may include supplying the rectified image of the label to an optical character recognition (OCR) algorithm.

The label may include an icon, and the decoding the content of the label may include supplying the rectified image of the label to an icon detection algorithm.

The rectifying the visual information may include: estimating, by the computing system, an orientation of each of the one or more surfaces with respect to the camera system based on the visual information; computing, by the computing system, for each surface of the one or more surfaces, a transformation matrix between the orientation of the surface and a fronto-parallel orientation with respect to the camera system; and transforming, by the computing system, at least a portion of the visual information of the object corresponding to each surface of the one or more surfaces with respect to the transformation matrix to compute a rectified image of each surface of the one or more surfaces.

At least one camera of the one or more cameras may be a depth camera, and the visual information may include a depth map of the object.

The estimating the orientation may include detecting a substantially planar shape of the label in the depth map, and the computing the transformation matrix may include computing a transformation between the substantially planar shape of the label in the depth map and the fronto-parallel orientation.

Each depth camera of the camera system may include: a time-of-flight depth camera; a structured light depth camera; a stereo depth camera including: at least two color cameras; a stereo depth camera including: at least two color cameras; and a color projector; a stereo depth camera including: at least two infrared cameras; a stereo depth camera including: at least two infrared cameras; an infrared projector; and a color camera; or a stereo depth camera comprising: at least two RGB-IR cameras; and an infrared projector.

The camera system may further include one or more 2-D cameras.

At least one camera of the one or more cameras may be a depth camera, and the visual information of the object may include a 3-D model.

The estimating the orientation of the label may include detecting a substantially planar surface of the 3-D model, the computing the transformation matrix may include computing a transformation of a virtual camera to the fronto-parallel orientation with respect to the substantially planar surface, and the rectified image of the label may be computed by rendering a view of the substantially planar surface of the 3-D model from the fronto-parallel orientation.

The camera system may further include one or more 2-D cameras.

At least one camera of the one or more cameras may be a 2-D camera and the scanning system may include an accelerometer rigidly attached to the camera, the visual information may include at least one 2-D image captured by the 2-D camera and accelerometer data associated with an orientation of the 2-D camera when the at least one 2-D image was captured, the object may be supported by a ground plane, and the object may have a cuboidal shape including a horizontal surface parallel to the ground plane and at least one vertical surface perpendicular to the ground plane.

The estimating the orientation of the label may include: detecting the horizontal surface and the at least one vertical surface of the object; measuring a direction normal to the ground plane based on the accelerometer data; and sampling an azimuth angle of the normal of the at least one vertical surface over a plurality of candidate azimuth values, and the computing the transformation matrix may include computing a plurality of transformation matrix corresponding to the plurality of candidate azimuth values.

The camera system may further include one or more depth cameras.

The one or more cameras of the scanning system may include a plurality of 2-D cameras, the visual information may include a first 2-D image captured by a first 2-D camera of the plurality of 2-D cameras, the first 2-D camera having a first pose with respect to the object, the visual information may include a second 2-D image captured by a second 2-D camera of the plurality of 2-D cameras, the second 2-D camera having a second pose with respect to the object, the second pose being different than the first pose of the first 2-D camera, the second 2-D camera being calibrated with the first 2-D camera, one or more planar surfaces of the object may be depicted by both the first 2-D image captured by the first 2-D camera and the second 2-D image captured by the second 2-D camera, and the estimating the orientation of each of the one or more surfaces may include triangulating a normal direction to each of the one or more surfaces of the object based on the first 2-D image captured by the first 2-D camera and the second 2-D image captured by the second 2-D camera.

According to one embodiment of the present invention, a system for decoding content of labels on objects includes: a scanning system including one or more cameras; a computing system connected to the scanning system, the computing system including a processor and memory storing instructions that, when executed by the processor, cause the processor to: control the scanning system to capture visual information of an object, the object having one or more labels on one or more exterior surfaces; detect one or more surfaces of the object depicting labels; rectify the visual information of the one or more surfaces of the object to compute one or more rectified images; and decode content of a label depicted in at least one of the one or more rectified images.

The label may include a barcode, and the decoding the content of the label may include supplying the rectified image of the label to a barcode recognition algorithm.

The label may include text, and the decoding the content of the label may include supplying the rectified image of the label to an optical character recognition (OCR) algorithm.

The instructions to rectify the visual information may include instructions that, when executed by the processor, cause the processor to: estimate an orientation of each of the one or more surfaces with respect to the camera system based on the visual information; compute, for each surface of the one or more surfaces, a transformation matrix between the orientation of the surface and a fronto-parallel orientation with respect to the camera system; and transform at least a portion of the visual information of the object corresponding to each surface of the one or more surface with respect to the transformation matrix to compute a rectified image of each surface of the one or more surfaces.

The one or more cameras may include at least one depth camera, the visual information of the object may include a depth map, the instructions to estimate the orientation of each of the one or more surfaces may include instructions that, when executed by the processor, cause the processor to detect a substantially planar shape of the label in the depth map, and the instructions to compute the transformation matrix may include instructions that, when executed by the processor, cause the processor to compute a transformation between the substantially planar shape of the label and the fronto-parallel orientation.

BRIEF DESCRIPTION OF THE DRAWINGS

The accompanying drawings, together with the specification, illustrate exemplary embodiments of the present invention, and, together with the description, serve to explain the principles of the present invention.

FIG. 5A is a schematic diagram of a scanning system configured to scan objects on a conveyor belt according to one embodiment of the present invention.

FIG. 5B is a schematic diagram of a scanning system according to one embodiment of the present invention configured to scan stationary objects (e.g., on a table).

DETAILED DESCRIPTION

Figure 1A:
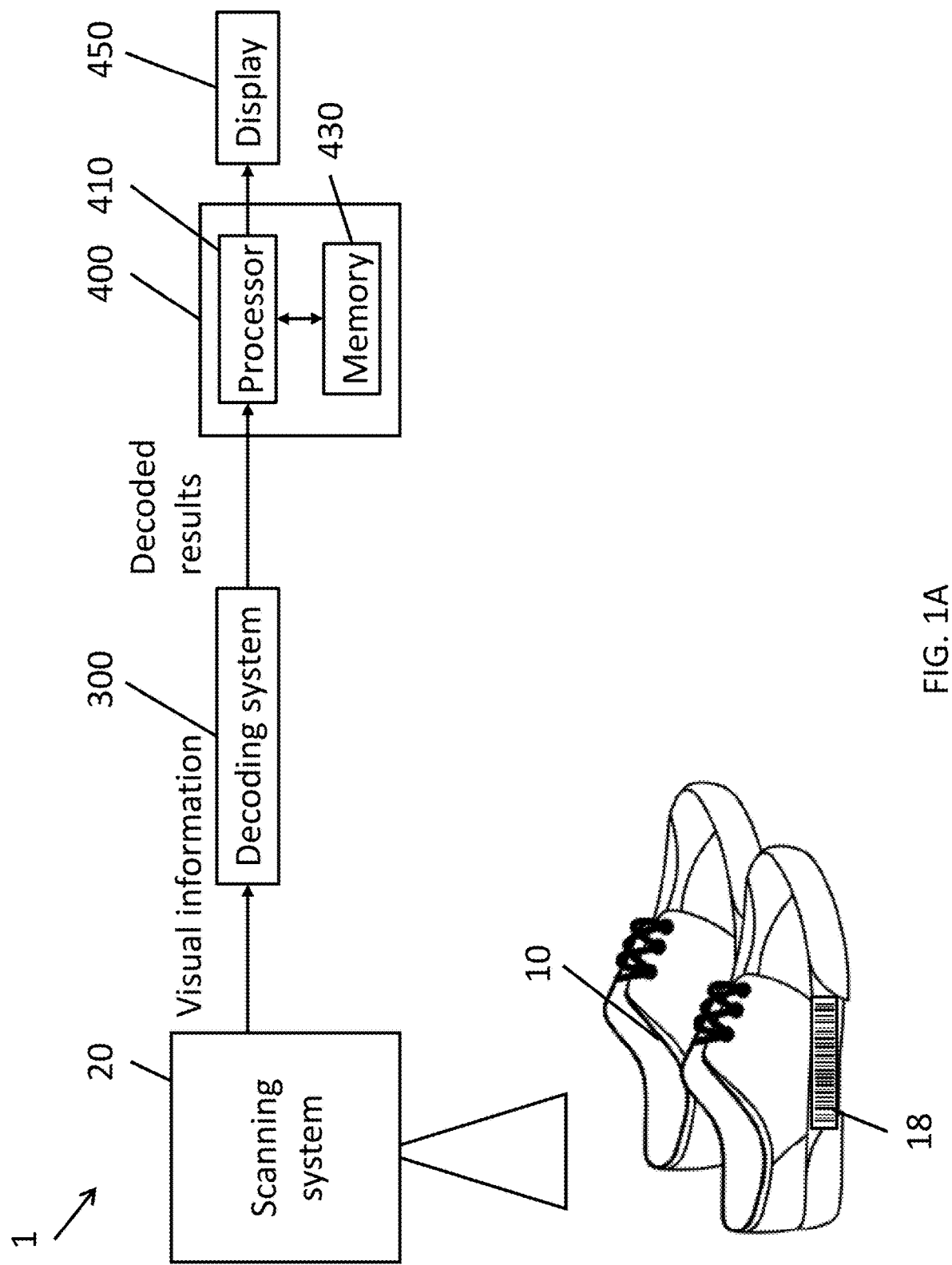
FIG. 1A is a schematic block diagram of a system according to one embodiment of the present invention for automatically scanning and detecting labels affixed to objects.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Aspects of embodiments of the present invention relate to systems and methods for improving the reading of labels, including text labels and barcode labels under perspective distortion. As used herein, the term "label" will refer to optically detectable markings (e.g., visible light markings or invisible light markings such as ultraviolet markings) on surfaces of an object. Common examples of labels include barcodes, text, and icons printed on the exterior surfaces of packages (e.g., markings identifying an "up" orientation, identifying the contents as fragile, or otherwise identifying the contents of the packages) as well as barcodes, text, and icons that are affixed to the exterior surfaces of objects (e.g., affixed using adhesives or other mechanisms for attachment). Labels may also include handwritten text and drawings applied to surfaces of an object using writing implements such as pens and markers.

There are several challenges to correctly reading text reading outside of the comparative domain of recognizing text in well-framed scanned documents and outside the domain of barcode reading in the context of particular controlled environments with high degree of manual, human control, such as supermarket checkout registers and manual human inventory management. For example, adapting OCR for text recognition and barcode scanning to highly automated and/or high throughput environments may pose particular challenges. As one example, in the case of barcode scanning in high throughput logistics environments, barcode scanning tunnels may be used to scan packages from a multitude of directions and at a multitude of angles in order to attempt to read affixed barcodes. The barcode scanning tunnels may be arranged to surround a conveyor belt in order to reduce or minimize the impact of the barcode scanning process on the throughput of the logistics system (e.g., without changing the speed of the conveyor belt or conveyor system). However, such barcode scanning tunnels are typically very costly.

As another example, in the case of fixed camera systems, the same camera configuration must be used for items (e.g., boxes) with different sizes and shapes, often delivered by automatic mechanisms such as conveyor belts. The cameras must thus be kept at a certain distance from the item, and the item itself cannot be repositioned for a better view of the labels on its surface, although the positions and orientations of the labels may differ from one object to the next. As a result, a label affixed to an item may occupy only a (potentially small) portion of the image acquired by a camera, and its location in the image may be unknown a priori, or known only to a certain approximation. Even in the case of handheld OCR or barcode readers, it may be impractical for a human operator to move the reader carefully in front of a label to acquire a close-up view, especially in the case of large items or items moving quickly on a conveyor belt.

In some such systems, the same cameras may be for multiple purposes. Reusing cameras for multiple purposes can reduce hardware costs and may also be important in space-constrained environments such as manufacturing facilities and warehouses for logistics. For example, the cameras that are used to read text or barcode labels may also be used for dimensioning (measuring the size) of the items (see, e.g., U.S. patent application Ser. No. 16/240,691, filed on Jan. 4, 2019, published as U.S. Patent Application Publication No. 2019/0213389 and U.S. patent application Ser. No. 16/724,029 filed in the United States Patent and Trademark Office on Dec. 20, 2019, the entire disclosures of which are incorporated by reference herein). Under some circumstances, dimensioning requires a view of the entire object, meaning that an image used for dimensioning must be acquired from a certain distance and/or with a particular field of view in order for the entire object to appear in a frame, as controlled by the sizes of the largest object expected to be encountered by or presented to the dimensioning system. From the same image used for dimensioning, the system must be able to localize and to read the textual or barcode content of any visible labels on the object's surface.

Another challenge is that images captured by such scanning system generally do not image the labels from a fronto-parallel pose (e.g., from a pose in which a label is squarely facing the camera), because the surface on which a label is affixed or printed may be at a possibly large slant angle with respect to the camera. Comparative systems for text recognition (e.g., optical character recognition) and/or barcode reading typically assume substantially fronto-parallel viewing of the label containing the text and/or barcode (e.g., where the text is substantially uniform in size across the image and where the spacing between the bars of the barcode are substantially even and uniform). Additionally, these comparative systems often assume that that the reading axis (the orientation of text lines, or the longitudinal axis of a linear barcode or with the vertical and horizontal axes of a 2-D barcode) is aligned with the horizontal image axis (e.g., with the rows of pixels in the image). These comparative systems may produce poor results when these assumptions are violated (e.g., when the text and/or barcode are imaged at a slant angle, which generates a "perspective distortion," or with in-plane rotation). One noticeable effect of perspective distortion is the variable foreshortening of surface areas depending on their distance to the camera. For example, a rectangular label may appear in the image as a trapezoid (Hartley & Zisserman, 2003). In the case of barcodes, the spacing between bars may change with distance if the image undergoes perspective distortion (e.g., bars that are nearer to the camera may appear more widely spaced than bars that are farther than the camera along a depth direction that is parallel to an axis of the camera). Reading text or barcodes under perspective distortion is difficult and computationally demanding (see, e.g., Qui Phan et al., 2013; Wachenfeld et al., 2008; and Gallo & Manduchi, 2011).

In order to deal with images containing text or barcode with a certain amount of perspective distortion (due to non-fronto-parallel viewing) or in-plane rotation, different techniques can be employed. For example, the image can be synthetically rotated at various predetermined angles, such that one of these rotations may result in the text or barcode sufficiently aligned with the desired or expected orientation. Likewise, multiple warped versions of the same image may be generated in accordance with predetermined transformations, in hopes that at least one of these will sufficiently or substantially remove the undesired perspective distortion. Another approach is to use more complex machine learning architectures, which can be trained with large datasets of text or barcode images, seen with multiple rotation angles and under various levels of perspective distortions, to remove the distortion (see, e.g., Shi et al., 2017; Cheng et al., 2018; Dai et al., 2018; Kulyukon & Zaman, 2014; Yun & Kim, 2017). These approaches are generally computationally intensive, possibly requiring use of cloud resources (computer clusters), and therefore may not be well suited in situations that call for local computation using limited resources.

Accordingly, aspects of embodiments of the present invention relate to techniques that facilitate reading labels from that are captured from angles or directions that are outside of the standard expected fronto-parallel direction, such as under perspective distortion and rotation, by augmenting standard OCR or text reading algorithms with automatic 3-D geometric transformations. One aspect of embodiments of the present invention described herein relate to systems and methods for the geometric characterization of the label-carrying surface. In some embodiments, this is achieved directly using 3-D measurements from a depth camera, or from the analysis of pairs of images of the same surface from two different color or grayscale cameras or from two or more different perspectives or poses with respect to the surface; or indirectly, from knowledge of the camera orientation (which may be known a priori, or measured using an inertial sensor), and from appropriate assumptions about the orientation of the label-carrying surface or surfaces. Once the geometry of the surface has been recovered, the acquired images can be properly rectified using an automatically computed transformation, effectively synthesizing a rectified image depicting a fronto-parallel view. The resulting rectified image depicting the label can then be supplied to an appropriate text recognition or OCR algorithm or appropriate barcode recognition algorithm to extract the information encoded in the label.

For the sake of clarity and convenience, it will be assumed in the following that labels to be read are located on surfaces that are locally planar. However, embodiments of the present invention are not limited thereto and the techniques described herein can be modified with simple extensions to be effective in the case of quasi-planar or non-planar surfaces. A planar or quasi-planar support surface may be expected, for example, for labels attached or printed on a box. For the purpose of discussion herein, an image is considered to be "correctly framed" when: (1) the image is taken from a fronto-parallel view, meaning that the camera's focal plane is substantially parallel to the label-carrying surface; and (2) the reading axis is substantially aligned with the horizontal camera axis (equivalently, substantially aligned with the horizontal axis of the image). As noted above, most comparative text and/or barcode reading techniques in the literature either implicitly or explicitly assume correct framing, and these comparative techniques generally fail when this assumption is not satisfied.

Figure 1B:
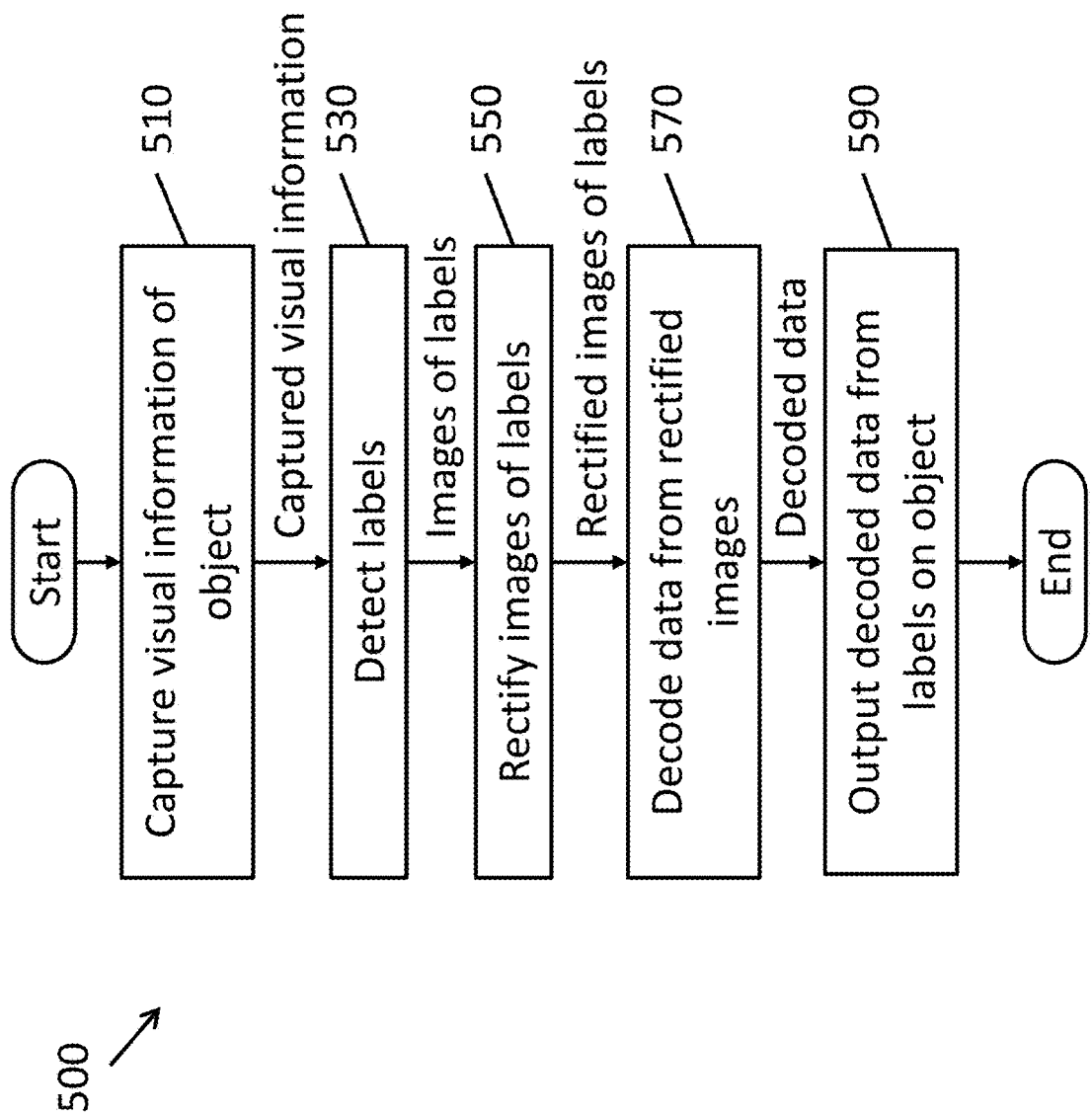
FIG. 1B is a flowchart of a method according to one embodiment of the present invention for scanning an object and recognizing encoded data on labels on the object.

FIG. 1A is a schematic block diagram of a system 1 according to one embodiment of the present invention for automatically scanning and detecting labels affixed to objects. FIG. 1B is a flowchart of a method 500 according to one embodiment of the present invention for scanning an object and recognizing encoded data on labels on the object.

As shown in FIGS. 1A and 1B, according to one embodiment a label reading system 1 includes a scanning system 20, which is configured to capture images (or visual information) of an object 10 operation 510. In operation 530, a decoding system 300 detects the presence of labels in the captured information, and at operation 550 rectifies those images of the labels. and at operation 570 decodes data appearing on labels 18 that appear on visible surfaces of the object 10 based on the captured visual information. The visual information may include the images captured by the scanning system 20 (e.g., monochrome or grayscale images, color images, depth map images, 3-D models, and the like). The decoding system 300 then outputs the decoded data in operation 540. In some embodiments, the decoded data is output, for example, to a user device 400, which may include a processor 410 and memory 430, where the memory 430 stores instructions to control the processor 410 to maintain information (e.g., lists) regarding the particular object that is scanned, such as decoded data representing the data encoded in the label 18. The user device 400 may also be used to control a display device 450, which may display information to a user, such as the content of the label and/or data retrieved from another source (e.g., a database). The user device 400 may also retrieve and display other information about the scanned object, such as dimensions of the object as computed by a dimensioning analysis system (see, e.g., U.S. Patent Application Publication No. 2019/0213389, incorporated by reference above) and/or information regarding defects detected in the object (see, e.g., U.S. Patent Application Publication No. US 2018/0322623, the entire disclosure of which is incorporated by reference herein). In some embodiments of the present invention, the decoded results are output in operation 540 to control machinery in an environment. For example, in some embodiments implemented in a manufacturing setting, when the decoding system 300 detects particular information and is used, for example, in conjunction with other information, the result of the analysis is used to control a conveyor system or other actuators within the manufacturing setting to redirect the item (e.g., sorting items based on SKU or routing packages based on geographic destination as identified based on information retrieved from a database based on identifying information contained in the label or based on information encoded directly in the label).

Scanning Systems/Visual Acquisition Systems

The terms "scanning system" and "visual acquisition system" will be used herein to refer to systems that are used to acquire visual information about an object, where the scanning system or visual acquisition system may include one or more cameras, an illumination system, a processing component, and some input/output (I/O) components.

As noted above, aspects of embodiments of the present invention relate to capturing visual information (e.g., images) of one or more labels on exterior surfaces of objects at operation 510, detecting the labels in the images at operation 530, rectifying the captured images of the labels at operation 550, and decoding the information on the labels at operation 590.

As such, aspects of embodiments of the present invention capture the surface colors (or "textures") and geometry of objects in order to decode the information. One component of label decoding systems according to embodiments of the present invention is a scanning system that is able to acquire geometry and color information in service of operation 510. Because of the volumetric nature of common goods and due to physical constraints such as target throughput and space availability around conveyor systems of manufacturing and logistics facilities, in some embodiments, 3-D scanning is performed by aggregating information from a multitude of 3-D scanners 100 (see, e.g., FIG. 2) at different vantage-points. Therefore, a scanning system 20 may include one or more 3-D scanners or depth cameras 100. In some embodiments, the scanning system 20 includes one or more 2-D cameras, which may be color cameras and/or monochrome (or grayscale) cameras.

Some aspects of embodiments of the present invention relate to gathering geometric (shape) and/or color information about the object itself, possibly from multiple different vantage points (poses) with respect to the object. Collecting these views of the object can provide the data for performing a comprehensive capture of the visible surfaces of the underlying objects. This procedure of capturing views of an object is sometimes referred to as three-dimensional scanning or three-dimensional modeling and can be effectively accomplished using a 3-D modeling system, which can include one or more 3-D scanners, each of which may include one or more depth cameras.

A three-dimensional scanner is a system that is able to acquire a 3-D model of a scene from visual information in the form of one or more streams of images. In one embodiment, a three-dimensional scanner includes one or more depth cameras, where a depth camera may include one or more color cameras, which acquire the color information about an object, and one or more Infrared (IR) cameras which may be used in conjunction with an IR structured-light illuminator to capture geometry information about the object. The special case in which there are two IR cameras and an IR structured-light illuminator is an instance of "active stereo," and allows for simultaneous scanning from multiple depth cameras with overlapping fields-of-view (the use of an invisible light illuminator such as an IR structured light illuminator and IR cameras reduces the side effects of the scanning system on humans in the neighboring environment—a visible light illuminator would be visible to humans in the neighboring environment, which may cause undesired eyestrain). The color and the infrared cameras are synchronized and geometrically calibrated, allowing these cameras to capture sequences of frames that are constituted by color images and depth-maps, for which it is possible to provide geometrical alignment. One example of a depth camera including two IR cameras, an IR structured light illuminator, and one color camera is described in U.S. Pat. No. 9,674,504, "DEPTH PERCEPTIVE TRINOCULAR CAMERA SYSTEM," issued by the United States Patent and Trademark Office on Jun. 6, 2017, the entire disclosure of which is incorporated by reference herein.

In some embodiments of the present invention, the depth cameras 100, also known as "range cameras," include at least two standard two-dimensional cameras that have overlapping fields of view. In more detail, these two-dimensional (2-D) cameras may each include a digital image sensor such as a complementary metal oxide semiconductor (CMOS) image sensor or a charge coupled device (CCD) image sensor and an optical system (e.g., one or more lenses) configured to focus light onto the image sensor. The optical axes of the optical systems of the 2-D cameras may be substantially parallel such that the two cameras image substantially the same scene, albeit from slightly different perspectives. Accordingly, due to parallax, portions of a scene that are farther from the cameras will appear in substantially the same place in the images captured by the two cameras, whereas portions of a scene that are closer to the cameras will appear in different positions.

Using a geometrically calibrated depth camera, it is possible to identify the 3-D locations of all visible points on the surface of the object with respect to a reference coordinate system (e.g., a coordinate system having its origin at the depth camera). Thus, a range image or depth image captured by a range camera 100 can be represented as a "cloud" of 3-D points, which can be used to describe the portion of the surface of the object (as well as other surfaces within the field of view of the depth camera).

Figure 2:
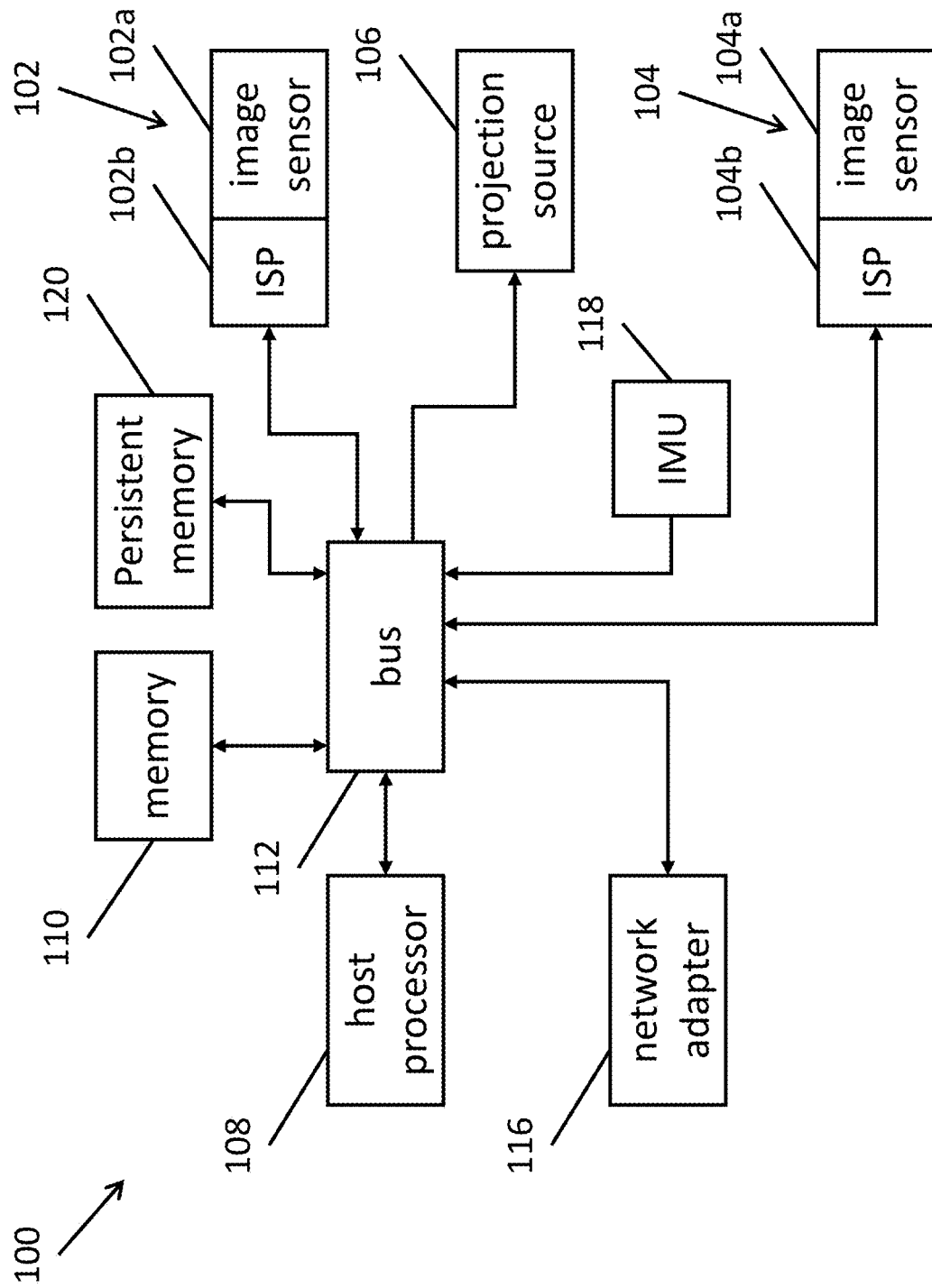
FIG. 2 is a block diagram of a depth camera system according to one embodiment of the present invention.

FIG. 2 is a block diagram of a stereo depth camera system according to one embodiment of the present invention. The depth camera system 100 shown in FIG. 2 includes a first camera 102, a second camera 104, a projection source 106 (or illumination source or active projection system), and a host processor 108 and memory 110, wherein the host processor may be, for example, a graphics processing unit (GPU), a more general purpose processor (CPU), an appropriately configured field programmable gate array (FPGA), or an application specific integrated circuit (ASIC). The first camera 102 and the second camera 104 may be rigidly attached, e.g., on a frame, such that their relative positions and orientations are substantially fixed. The first camera 102 and the second camera 104 may be referred to together as a "depth camera." The first camera 102 and the second camera 104 include corresponding image sensors 102*a* and 104*a*, and may also include corresponding image signal processors (ISP) 102*b* and 104*b*. The various components may communicate with one another over a system bus 112. The depth camera system 100 may include additional components such as a network adapter 116 to communicate with other devices, an inertial measurement unit (IMU) 118 such as a gyroscope to detect acceleration of the depth camera 100 (e.g., detecting the direction of gravity to determine orientation), and persistent memory 120 such as NAND flash memory for storing data collected and processed by the depth camera system 100. The IMU 118 may be of the type commonly found in many modern smartphones. The image capture system may also include other communication components, such as a universal serial bus (USB) interface controller.

Although the block diagram shown in FIG. 2 depicts a depth camera 100 as including two cameras 102 and 104 coupled to a host processor 108, memory 110, network adapter 116, IMU 118, and persistent memory 120, embodiments of the present invention are not limited thereto. For example, the three depth cameras 100 shown in FIG. 6 (described in more detail below) may each include cameras 102 and 104, projection source 106, and a communication component (e.g., a USB connection or a network adapter 116), and processing the two-dimensional images captured by the cameras 102 and 104 of the three depth cameras 100 may be performed by a shared processor or shared collection of processors in communication with the depth cameras 100 using their respective communication components or network adapters 116.

In some embodiments, the image sensors 102*a* and 104*a* of the cameras 102 and 104 are RGB-IR image sensors. Image sensors that are capable of detecting visible light (e.g., red-green-blue, or RGB) and invisible light (e.g., infrared or IR) information may be, for example, charged coupled device (CCD) or complementary metal oxide semiconductor (CMOS) sensors. Generally, a conventional RGB camera sensor includes pixels arranged in a "Bayer layout" or "RGBG layout," which is 50% green, 25% red, and 25% blue. Band pass filters (or "micro filters") are placed in front of individual photodiodes (e.g., between the photodiode and the optics associated with the camera) for each of the green, red, and blue wavelengths in accordance with the Bayer layout. Generally, a conventional RGB camera sensor also includes an infrared (IR) filter or IR cut-off filter (formed, e.g., as part of the lens or as a coating on the entire image sensor chip) which further blocks signals in an IR portion of electromagnetic spectrum.

An RGB-IR sensor is substantially similar to a conventional RGB sensor but may include different color filters. For example, in an RGB-IR sensor, one of the green filters in every group of four photodiodes is replaced with an IR band-pass filter (or micro filter) to create a layout that is 25% green, 25% red, 25% blue, and 25% infrared, where the infrared pixels are intermingled among the visible light pixels. In addition, the IR cut-off filter may be omitted from the RGB-IR sensor, the IR cut-off filter may be located only over the pixels that detect red, green, and blue light, or the IR filter can be designed to pass visible light as well as light in a particular wavelength interval (e.g., 840-860 nm). An image sensor capable of capturing light in multiple portions or bands or spectral bands of the electromagnetic spectrum (e.g., red, blue, green, and infrared light) will be referred to herein as a "multi-channel" image sensor.

In some embodiments of the present invention, the image sensors 102*a* and 104*a* are conventional visible light sensors. In some embodiments of the present invention, the system includes one or more visible light cameras (e.g., RGB cameras) and, separately, one or more invisible light cameras (e.g., infrared cameras, where an IR band-pass filter is located across all over the pixels). In other embodiments of the present invention, the image sensors 102*a* and 104*a* are infrared (IR) light sensors.

In some embodiments in which the depth cameras 100 include color image sensors (e.g., RGB sensors or RGB-IR sensors), the color image data collected by the depth cameras 100 may supplement the color image data captured by the color cameras 150. In addition, in some embodiments in which the depth cameras 100 include color image sensors (e.g., RGB sensors or RGB-IR sensors), the color cameras 150 may be omitted from the system.

Generally speaking, a stereoscopic depth camera system includes at least two cameras that are spaced apart from each other and rigidly mounted to a shared structure such as a rigid frame. The cameras are oriented in substantially the same direction (e.g., the optical axes of the cameras may be substantially parallel) and have overlapping fields of view. These individual cameras can be implemented using, for example, a complementary metal oxide semiconductor (CMOS) or a charge coupled device (CCD) image sensor with an optical system (e.g., including one or more lenses) configured to direct or focus light onto the image sensor. The optical system can determine the field of view of the camera, e.g., based on whether the optical system is implements a "wide angle" lens, a "telephoto" lens, or something in between.

In the following discussion, the image acquisition system of the depth camera system may be referred to as having at least two cameras, which may be referred to as a "master" camera and one or more "slave" cameras. Generally speaking, the estimated depth or disparity maps computed from the point of view of the master camera, but any of the cameras may be used as the master camera. As used herein, terms such as master/slave, left/right, above/below, first/second, and CAM1/CAM2 are used interchangeably unless noted. In other words, any one of the cameras may be master or a slave camera, and considerations for a camera on a left side with respect to a camera on its right may also apply, by symmetry, in the other direction. In addition, while the considerations presented below may be valid for various numbers of cameras, for the sake of convenience, they will generally be described in the context of a system that includes two cameras. For example, a depth camera system may include three cameras. In such systems, two of the cameras may be invisible light (infrared) cameras and the third camera may be a visible light (e.g., a red/blue/green color camera) camera. All three cameras may be optically registered (e.g., calibrated) with respect to one another. One example of a depth camera system including three cameras is described in U.S. patent application Ser. No. 15/147,879 "Depth Perceptive Trinocular Camera System" filed in the United States Patent and Trademark Office on May 5, 2016, the entire disclosure of which is incorporated by reference herein.

To detect the depth of a feature in a scene imaged by the cameras, the depth camera system determines the pixel location of the feature in each of the images captured by the cameras. The distance between the features in the two images is referred to as the disparity, which is inversely related to the distance or depth of the object. (This is the effect when comparing how much an object "shifts" when viewing the object with one eye at a time—the size of the shift depends on how far the object is from the viewer's eyes, where closer objects make a larger shift and farther objects make a smaller shift and objects in the distance may have little to no detectable shift.) Techniques for computing depth using disparity are described, for example, in R. Szeliski. "Computer Vision: Algorithms and Applications", Springer, 2010 pp. 467 et seq.

The magnitude of the disparity between the master and slave cameras depends on physical characteristics of the depth camera system, such as the pixel resolution of cameras, distance between the cameras and the fields of view of the cameras. Therefore, to generate accurate depth measurements, the depth camera system (or depth perceptive depth camera system) is calibrated based on these physical characteristics.

In some depth camera systems, the cameras may be arranged such that horizontal rows of the pixels of the image sensors of the cameras are substantially parallel. Image rectification techniques can be used to accommodate distortions to the images due to the shapes of the lenses of the cameras and variations of the orientations of the cameras.

In more detail, camera calibration information can provide information to rectify input images so that epipolar lines of the equivalent camera system are aligned with the scanlines of the rectified image. In such a case, a 3-D point in the scene projects onto the same scanline index in the master and in the slave image. Let $u_m$ and $u_s$ be the coordinates on the scanline of the image of the same 3-D point p in the master and slave equivalent cameras, respectively, where in each camera these coordinates refer to an axis system centered at the principal point (the intersection of the optical axis with the focal plane) and with horizontal axis parallel to the scanlines of the rectified image. The difference $u_s - u_m$ is called disparity and denoted by d; it is inversely proportional to the orthogonal distance of the 3-D point with respect to the rectified cameras (that is, the length of the orthogonal projection of the point onto the optical axis of either camera).

Stereoscopic algorithms exploit this property of the disparity. These algorithms achieve 3-D reconstruction by matching points (or features) detected in the left and right views, which is equivalent to estimating disparities. Block matching (BM) is a commonly used stereoscopic algorithm. Given a pixel in the master camera image, the algorithm computes the costs to match this pixel to any other pixel in the slave camera image. This cost function is defined as the dissimilarity between the image content within a small window surrounding the pixel in the master image and the pixel in the slave image. The optimal disparity at point is finally estimated as the argument of the minimum matching cost. This procedure is commonly addressed as Winner-Takes-All (WTA). These techniques are described in more detail, for example, in R. Szeliski. "Computer Vision: Algorithms and Applications", Springer, 2010. Since stereo algorithms like BM rely on appearance similarity, disparity computation becomes challenging if more than one pixel in the slave image have the same local appearance, as all of these pixels may be similar to the same pixel in the master image, resulting in ambiguous disparity estimation. A typical situation in which this may occur is when visualizing a scene with constant brightness, such as a flat wall.

Methods exist that provide additional illumination by projecting a pattern that is designed to improve or optimize the performance of block matching algorithm that can capture small 3-D details such as the one described in U.S. Pat. No. 9,392,262 "System and Method for 3-D Reconstruction Using Multiple Multi-Channel Cameras," issued on Jul. 12, 2016, the entire disclosure of which is incorporated herein by reference. Another approach projects a pattern that is purely used to provide a texture to the scene and particularly improve the depth estimation of texture-less regions by disambiguating portions of the scene that would otherwise appear the same.

The projection source 106 according to embodiments of the present invention may be configured to emit visible light (e.g., light within the spectrum visible to humans and/or other animals) or invisible light (e.g., infrared light) toward the scene imaged by the cameras 102 and 104. In other words, the projection source may have an optical axis substantially parallel to the optical axes of the cameras 102 and 104 and may be configured to emit light in the direction of the fields of view of the cameras 102 and 104. In some embodiments, the projection source 106 may include multiple separate illuminators, each having an optical axis spaced apart from the optical axis (or axes) of the other illuminator (or illuminators), and spaced apart from the optical axes of the cameras 102 and 104.

An invisible light projection source may be better suited to for environments that include people because invisible light would not interfere with the subject's ability to see, whereas a visible light projection source may shine uncomfortably into the subject's eyes or may undesirably affect the experience by adding patterns to the scene. Examples of systems that include invisible light projection sources are described, for example, in U.S. patent application Ser. No. 14/788,078 "Systems and Methods for Multi-Channel Imaging Based on Multiple Exposure Settings," filed in the United States Patent and Trademark Office on Jun. 30, 2015, the entire disclosure of which is herein incorporated by reference.

Active projection sources can also be classified as projecting static patterns, e.g., patterns that do not change over time, and dynamic patterns, e.g., patterns that do change over time. In both cases, one aspect of the pattern is the illumination level of the projected pattern. This may be relevant because it can influence the depth dynamic range of the depth camera system. For example, if the optical illumination is at a high level, then depth measurements can be made of distant objects (e.g., to overcome the diminishing of the optical illumination over the distance to the object, by a factor proportional to the inverse square of the distance) and under bright ambient light conditions. However, a high optical illumination level may cause saturation of parts of the scene that are close-up. On the other hand, a low optical illumination level can allow the measurement of close objects, but not distant objects.

Although embodiments of the present invention are described herein with respect to stereo depth camera systems, embodiments of the present invention are not limited thereto and may also be used with other depth camera systems such as structured light cameras, time of flight (ToF) cameras and LIDAR cameras.

Depending on the choice of camera, different techniques may be used to generate the 3-D model. For example, Dense Tracking and Mapping in Real Time (DTAM) uses color cues for scanning and Simultaneous Localization and Mapping (SLAM) uses depth data (or a combination of depth and color data) to generate the 3-D model.

Figure 3:
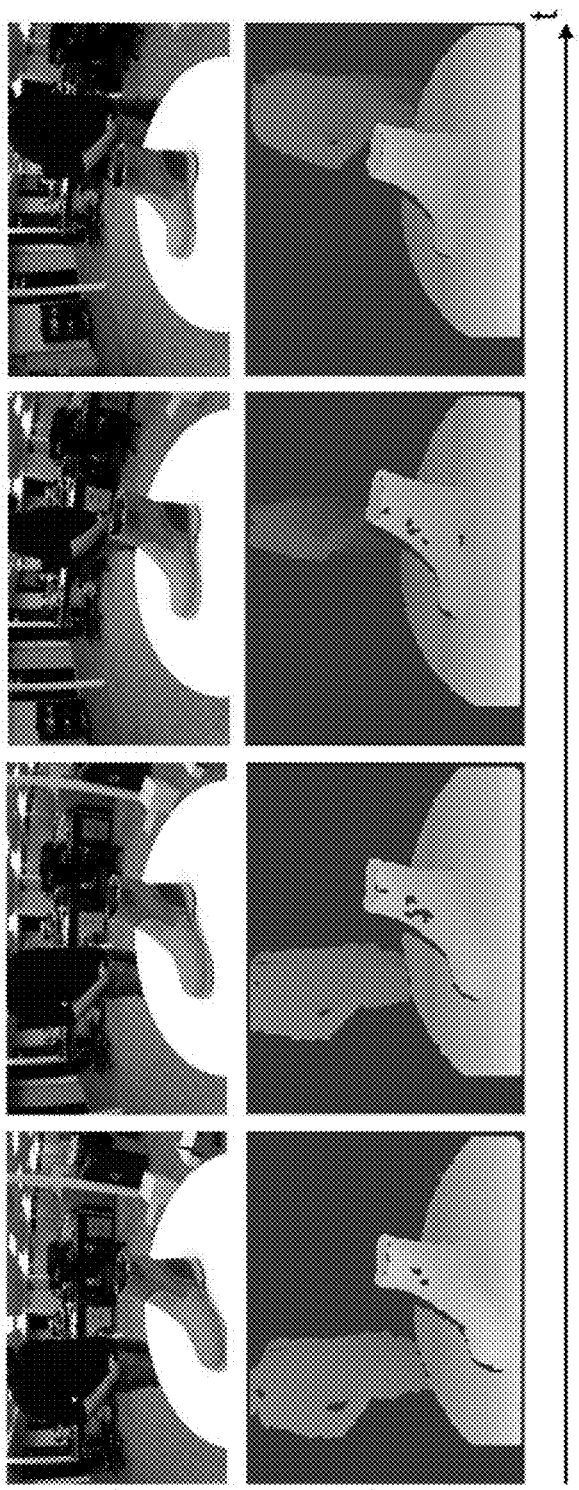
FIG. 3 is an example of a sequence of frames including depth maps and color images acquired by a depth camera that includes active stereo and at least one color camera.

FIG. 3 is an example of a sequence of frames including depth maps and color images acquired by a depth camera that includes active stereo and at least one color camera. As shown in FIG. 3, the upper row shows four color images of a boot on a table, while the lower row shows the depth maps corresponding to (e.g., captured contemporaneously or concurrently or substantially simultaneously with) the color images. As shown in the bottom row, portions of the scene that are closer to the depth camera are shown in yellow and portions of the scene that are farther away are shown in blue. Accordingly, the boot and the table are shown generally in yellow, while the background, including a person standing in the background, are shown in shades of blue. The object of interest can be separated from the background by removing pixels that have a depth greater than a threshold (e.g., removing the blue pixels in the images shown in the bottom row of FIG. 3) and by also removing the planar surface at the bottom of the remaining model.

The depth images captured at the various angles (e.g., the different columns of FIG. 3) can be combined to generate a 3-D model of the object through techniques such as iterative closest point (ICP) and structure from motion (SfM). The 3-D models may be represented as a point cloud (e.g., a collection of three-dimensional points having x, y, and z coordinates) and/or as a mesh (e.g., a collection of triangles). The color information captured by the color camera (upper row of FIG. 3) is mapped onto the surface of the 3-D model as texture information. By combining color information captured from multiple angles can remove optical artifacts such as glare (for example, a diffuse texture map can be captured by taking a minimum color vector for any given surface point as the color of that particular location of the 3-D model, thereby removing saturated values that correspond to glare that is visible from particular poses).

Figure 4B:
FIG. 4B is a 2-D view of an example of a 3-D mesh model captured using one or more depth cameras.
Figure 4A:
FIG. 4A is a 2-D view of an example of a 3-D point cloud model.

FIG. 4A is a 2-D view of an example of a 3-D point cloud model, and FIG. 4B is a 2-D view of an example of a 3-D mesh model captured using one or more depth cameras. Examples of systems and methods for scanning are described in, for example, U.S. patent application Ser. No. 15/382,210, "3D SCANNING APPARATUS INCLUDING SCANNING SENSOR DETACHABLE FROM SCREEN," filed in the United States Patent and Trademark Office on Dec. 16, 2016; U.S. patent application Ser. No. 15/445,735, "ASSISTED SCANNING," filed in the United States Patent and Trademark Office on Feb. 28, 2017; and U.S. patent application Ser. No. 15/630,715, "SYSTEM AND METHODS FOR A COMPLETE 3D OBJECT SCAN," filed in the United States Patent and Trademark Office on Jun. 22, 2017; the entire disclosures of which are incorporated by reference herein.

To capture a full 3-D model of an object (e.g., of substantially all non-occluded surfaces of the object), it is necessary to acquire frames from an ensemble of different vantage points, such that all the locations on the surface of the object being scanned are framed from at least one of such frames. In some circumstances, it may be impractical to capture images of the bottom surface of the object (e.g., the surface of the object resting on a support such as a conveyor belt) and therefore, without limitation thereto, the term "full 3-D model" will be assumed to include circumstances where the bottom surface of the object is not captured. Capturing such information from an ensemble of viewpoints is generally a bottleneck of 3-D modeling systems, especially in the case of objects moving on a conveyor belt on a manufacturing line. Gathering such a large amount of data from a single scanner it would generally require a relatively long amount of time and the exploitation of moving components that are able to move the scanner to account for the motion of the conveyor belt. Accordingly, some embodiments of the present invention relate to aggregating data coming from multiple depth cameras (or multiple 3-D scanners), as shown in FIGS. 5A, 5B, and 6.

FIG. 5A is a schematic diagram of a scanning system 20 configured to scan objects on a conveyor belt according to one embodiment of the present invention. FIG. 5B is a schematic diagram of a scanning system 20 according to one embodiment of the present invention configured to scan stationary objects (e.g., on a table).

Figure 6:
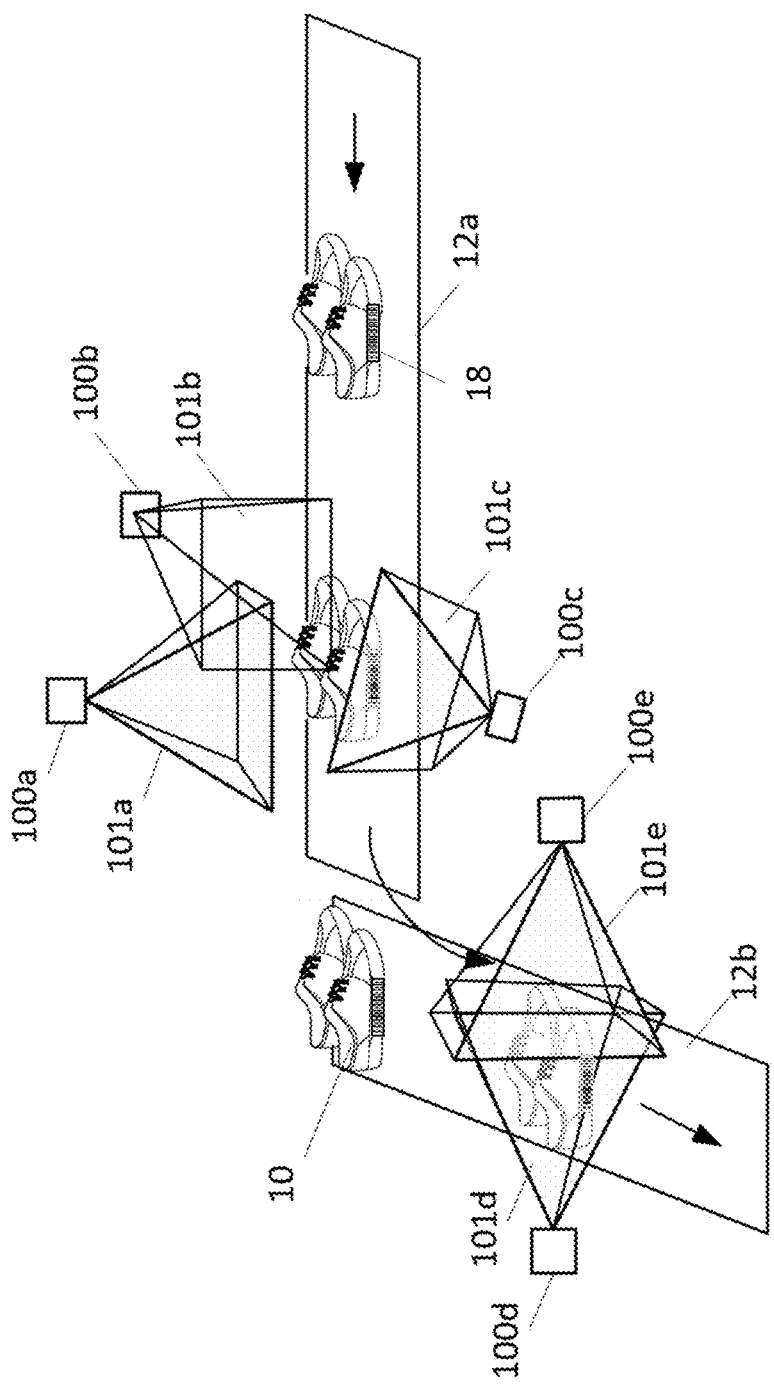
FIG. 6 is a schematic depiction of an object (depicted as a pair of shoes) traveling on a conveyor belt having two portions, where the first portion moves the object along a first direction and the second portion moves the object along a second direction that is orthogonal to the first direction in accordance with one embodiment of the present invention.

As shown in FIGS. 5A, 5B, and 6, a scanning system 20 may include multiple depth cameras 100. Each of the depth cameras 100 is calibrated at manufacturing, obtaining an estimate of the intrinsic parameters of its (2-D) camera sensors and an estimate of the intra-scanner extrinsic parameters (e.g. the rotation and translation between all the sensors, such as image sensors 102a and 104a of FIG. 2, of a single depth camera 100). An overview of standard multi-camera calibration procedures can be found in Zanuttigh, P., et al., Time-of-Flight and Structured Light Depth Cameras. 2016, Springer.

As one example of an arrangement of cameras, FIG. 6 is a schematic depiction of an object 10 (depicted as a pair of shoes) traveling on a conveyor belt 12 having two portions, where the first portion moves the object 10 along a first direction and the second portion moves the object 10 along a second direction that is orthogonal to the first direction in accordance with one embodiment of the present invention. When the object 10 travels along the first portion 12a of the conveyor belt 12, a first camera 100a images the top surface of the object 10 from above, while second and third cameras 100b and 100c image the sides of the object 10. In this arrangement, it may be difficult to image the ends of the object 10 because doing so would require placing the cameras along the direction of movement of the conveyor belt and therefore may obstruct the movement of the objects 10. As such, the object 10 may transition to the second portion 12b of the conveyor belt 12, where, after the transition, the end of the object 10 are now visible to cameras 100d and 100e located on the sides of the second portion 12b of the conveyor belt 12. As such, FIG. 6 illustrates an example of an arrangement of cameras that allows coverage of the entire visible surface of the object 10. In the particular arrangement shown in FIG. 6, images of the label 18 on the object 10 are captured by third camera 100c, but if the object 10 were oriented in a different direction, then images of the label 18 may be captured by other cameras or from multiple different depth cameras 100.

In some embodiments, the extrinsic parameters of the depth cameras 100 (e.g., relative poses) are estimated through another calibration step, in which a calibration target (e.g., an object of known size with identifiable and precisely detectable features, such as a black-and-white 2-D checkerboard) is acquired by all the depth cameras, in order to detect the relative rotation and translation between each of the scanner composing the 3-D modeling system. Accordingly, the extrinsic parameters can be used to compute or to estimate the transformations that may be applied to the separate depth maps (e.g., 3-D point clouds) captured by the different depth cameras in order to merge the depth maps to generate the captured 3-D model of the object.

Examples of systems and methods for three-dimensional scanning are described in more detail in U.S. patent application Ser. No. 15/866,217, "SYSTEMS AND METHODS FOR DEFECT DETECTION," filed in the United States Patent and Trademark Office on Jan. 9, 2018 and U.S. patent application Ser. No. 15/974,595, "SYSTEMS AND METHODS FOR INSPECTION AND DEFECT DETECTION USING 3-D SCANNING," filed in the United States Patent and Trademark Office on May 8, 2018, the entire disclosures of which are incorporated by reference herein.

While various embodiments of the present invention are described above with respect to scanning systems 20 that include depth cameras 100, embodiments of the present invention are not limited thereto, and include circumstances in which the scanning systems 20 merely include one or more 2-D cameras.

Accordingly aspects of embodiments of the present invention relate to the use of scanning systems 20 such as those discussed above for acquiring visual information of an object (e.g., images of an object) in operation 510 for further processing in order to decode information from labels on the surface of the object.

Generation of 3-D Models

If depth images are captured by the depth cameras 100 at different poses (e.g., different locations with respect to the target object 10), then it is possible to acquire data regarding the shape of a larger portion of the surface of the target object 10 than could be acquired by a single depth camera through a point cloud merging module 210 (see FIG. 7) of a 3-D model generation module 200 of the scanning system 20 that merges the separate depth images (represented as point clouds) 14 into a merged point cloud 220. For example, opposite surfaces of an object (e.g., the medial and lateral sides of the boot shown in FIG. 7) can both be acquired, whereas a single camera at a single pose could only acquire a depth image of one side of the target object at a time. The multiple depth images can be captured by moving a single depth camera over multiple different poses or by using multiple depth cameras located at different positions. Merging the depth images (or point clouds) requires additional computation and can be achieved using techniques such as an Iterative Closest Point (ICP) technique (see, e.g., Besl, Paul J., and Neil D. McKay. "Method for registration of 3-D shapes." Robotics-DL tentative. International Society for Optics and Photonics, 1992), which can automatically compute the relative poses of the depth cameras by optimizing (e.g., minimizing) a particular alignment metric. The ICP process can be accelerated by providing approximate initial relative poses of the cameras, which may be available if the cameras are "registered" (e.g., if the poses of the cameras are already known and substantially fixed in that their poses do not change between a calibration step and runtime operation). Systems and methods for capturing substantially all visible surfaces of an object are described, for example, in U.S. patent application Ser. No. 15/866,217, "Systems and Methods for Defect Detection," filed in the United States Patent and Trademark Office on Jan. 9, 2018, the entire disclosure of which is incorporated by reference herein.

A point cloud, which may be obtained by merging multiple aligned individual point clouds (individual depth images) can be processed to remove "outlier" points due to erroneous measurements (e.g., measurement noise) or to remove structures that are not of interest, such as surfaces corresponding to background objects (e.g., by removing points having a depth greater than a particular threshold depth) and the surface (or "ground plane") that the object is resting upon (e.g., by detecting a bottommost plane of points).

In some embodiments, the system further includes a plurality of color cameras 150 configured to capture texture (color) data 16 of the query object. As noted above, in some embodiments of the present invention, the depth cameras may use RBG-IR sensors which capture both infrared data and color camera data, such that the depth cameras 100 provide color data 166 instead of using separate color cameras 150. The texture data may include the color, shading, and patterns on the surface of the object that are not present or evident in the physical shape of the object. In some circumstances, the materials of the target object may be reflective (e.g., glossy). As a result, texture information may be lost due to the presence of glare and the captured color information may include artifacts, such as the reflection of light sources within the scene. As such, some aspects of embodiments of the present invention are directed to the removal of glare in order to capture the actual color data of the surfaces. In some embodiments, this is achieved by imaging the same portion (or "patch") of the surface of the target object from multiple poses, where the glare may only be visible from a small fraction of those poses. As a result, the actual color of the patch can be determined by computing a color vector associated with the patch for each of the color cameras, and computing a color vector having minimum magnitude from among the color vectors. This technique is described in more detail in U.S. patent application Ser. No. 15/679,075, "System and Method for Three-Dimensional Scanning and for Capturing a Bidirectional Reflectance Distribution Function," filed in the United States Patent and Trademark Office on Aug. 15, 2017, the entire disclosure of which is incorporated by reference herein.

Figure 7:
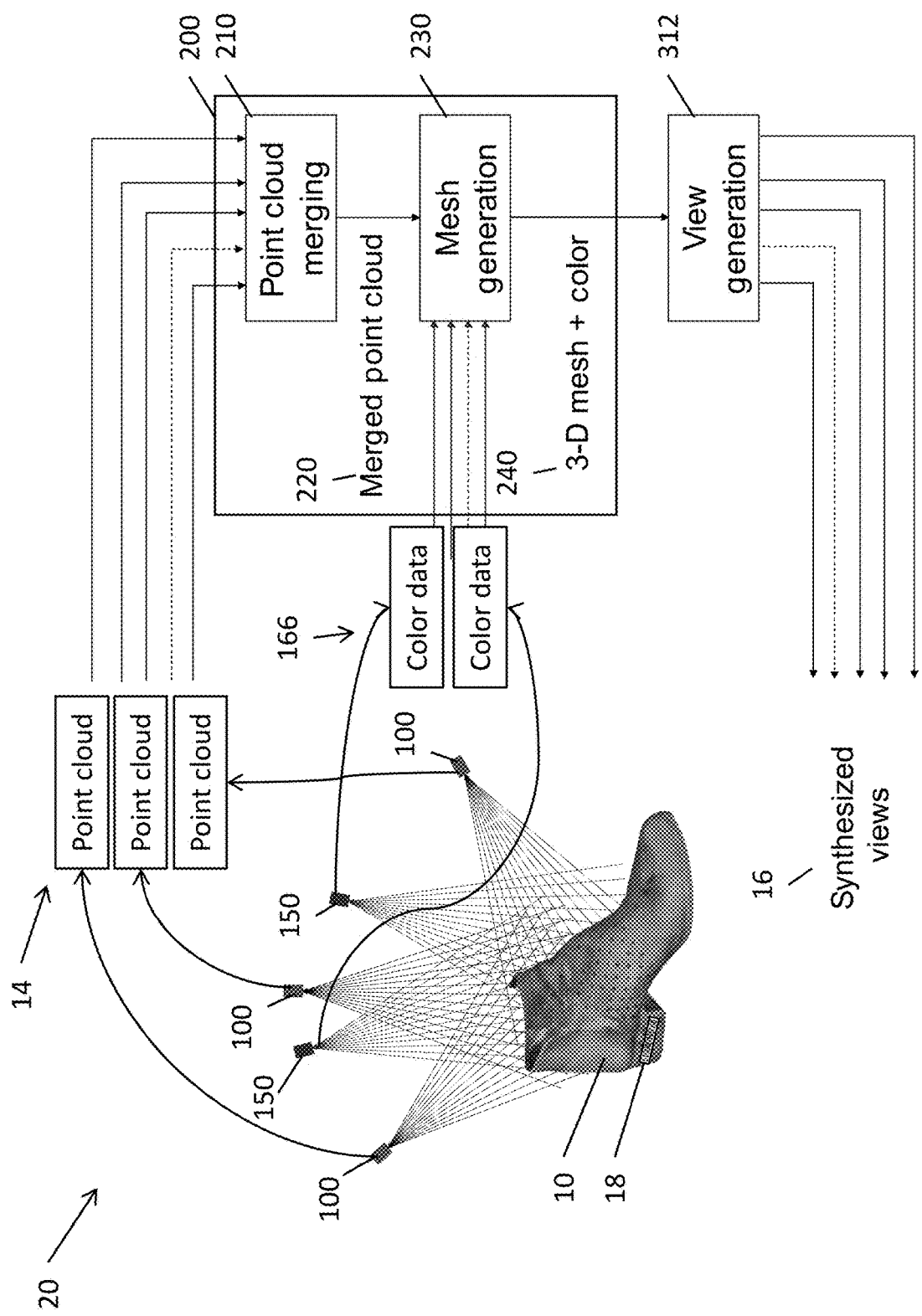
FIG. 7 is a schematic block diagram illustrating a process for capturing images of a target object and generating synthesized views of the target object according to one embodiment of the present invention.

In some embodiments, the point clouds are combined to generate a 3-D model. FIG. 7 is a schematic block diagram illustrating a process for capturing images of a target object and generating synthesized views of the target object according to one embodiment of the present invention. For example, the separate point clouds 14 are merged by a point cloud merging module 210 to generate a merged point cloud 220 (e.g., by using ICP to align and merge the point clouds and also by removing extraneous or spurious points to reduce noise and to manage the size of the point cloud 3-D model). In some embodiments, a mesh generation module 230 computes a 3-D mesh 240 from the merged point cloud using techniques such as Delaunay triangulation and alpha shapes and software tools such as MeshLab (see, e.g., P. Cignoni, M. Callieri, M. Corsini, M. Dellepiane, F. Ganovelli, G. Ranzuglia MeshLab: an Open-Source Mesh Processing Tool Sixth Eurographics Italian Chapter Conference, pages 129-136, 2008). The 3-D model (whether a 3-D point cloud model 220 or a 3-D mesh model 240) can be combined with color information 16 from the color cameras 150 about the color of the surface of the object at various points, and this color information may be applied to the 3-D point cloud or 3-D mesh model as a texture map (e.g., information about the color of the surface of the model).

In various embodiments of the present invention, the 3-D point cloud model 220, the 3-D mesh model 240, and/or the synthesized views 16 may be used as the visual information used by the decoding system 300 to decode the content of the labels 18 affixed to the object 10.

Detecting, Rectifying, and Decoding Labels

Referring back to FIG. 2, the decoding system 300 detects the presence of labels in the captured visual information of objects in operation 530, rectifies the images of the labels of the object in operation 550, and decodes the data appearing in the labels in operation 570.

Particular techniques by which the decoding system 300 detects the presence of labels and rectifies the image of the label captured by the scanning system 20 may vary in accordance with particular characteristics of the scanning system 20 used in any particular embodiment. For example, in some embodiments, the scanning system includes a depth camera system. In the case of a depth camera system, 3-D geometry information about the surface of the object holding the label 18 may be used in performing the detection and rectification of the image of the label. In some embodiments, the scanning system 20 includes a single color camera or a single monochrome (or grayscale) 2-D camera, in which case heuristic techniques and assumptions about the general shapes of the objects expected to be encountered, such as object 10, and assumptions about the sizes and shapes of labels, such as label 18, are used to assist in detecting and rectifying the images of the labels.

According to some embodiments of the present invention, the decoding system 300 detects the labels within the captured visual information in operation 530 using, for example, a trained image segmentation neural network. For example, a deep convolutional neural network can be trained to perform image segmentation to identify portions of images that appear to correspond to labels. These portions may include text (e.g., in various languages, such as English, Chinese, Japanese, Arabic, and the like), barcodes, icons, and the like. One approach to training such an image segmentation neural network is to apply a supervised learning technique by supplying training data containing representative training visual information (e.g., 2-D images and/or depth images of objects with a variety of different labels imaged at a variety of different angles and orientations with respect to the cameras) and corresponding ground truth training data identifying the portions of the training data that contain images of labels on the objects, and updating the parameters of the deep neural network (e.g., using backpropagation) to cause the network to output the desired ground truth training data. In the case where the visual information includes 2-D images and/or depth images, the training images may include 2-D images and/or depth maps, and in the case where the visual information includes 3-D models, the training images may include 2-D renderings of the 3-D models from a plurality of angles (e.g., from eight virtual camera positions around the 3-D model). In some embodiments, a pre-trained deep convolutional backbone such as MobileNetV2 (see, e.g., Sandler, Mark, et al. "MobileNetV2: Inverted residuals and linear bottlenecks." *Proceedings of the IEEE Conference on Computer Vision and Pattern Recognition.* 2018), MobileNetV3 (see, e.g., Howard, Andrew, et al. "Searching for mobilenetv3." *arXiv preprint* arXiv:1905.02244 (2019)), MnasNet (see, e.g., Tan, Mingxing, et al. "Mnasnet: Platform-aware neural architecture search for mobile." *Proceedings of the IEEE Conference on Computer Vision and Pattern Recognition.* 2019), and Xception (see, e.g., Chollet, François. "Xception: Deep learning with depthwise separable convolutions." *Proceedings of the IEEE conference on computer vision and pattern recognition.* 2017) may be used as a component of the convolutional neural network.

In some embodiments of the present invention, the decoding system 300 detects the labels within the captured visual information in accordance with detecting recognizable components of labels, such as: Finder Patterns (or Position Markers or Eyes) in three corners of a QR code; a bullseye symbol at the center of MaxiCode; start and stop patterns of a PDF417 code; start and end markers of an EAN-13 code; symbols arranged along straight lines (as characteristic of text); contiguous portions of an object having a regular shape (e.g., rectangular shape with rounded or square corners) under perspective distortion (e.g., trapezoids, parallelograms, and the like) and a background color different from other parts of the object (e.g., as being characteristic of a white adhesive label attached to the exterior of a brown cardboard package).

In some embodiments of the present invention, the decoding system 300 detects all substantially planar surfaces of a 3-D model computed from the captured visual information under the assumption that any of these substantially planar surfaces may include labels.

By detecting the portions of the visual information that depict portions of labels, the portions containing the labels can be extracted (e.g., cropped) from other parts of the captured visual information to generate the images of the labels that in operation 530.

Rectifying Images of Labels and Computing Correct Framing

At operation 550, the decoding system 300 rectifies the images of the labels, which includes computing a "correct framing" of the label. Correct framing results when the camera is properly oriented, that is, has a fronto-parallel view of the label-carrying surface with the reading axis of the data on the label substantially aligned with the horizontal axis of the captured images. Geometry (Hartley & Zisserman, 2013) can be used to model how encoded content (e.g., text or barcode) printed or attached on a planar support, appears in images taken by a camera (or camera system) at a particular location and orientation (collectively called a "pose"). Formally, let $p^W = (p_x^W, p_y^W, p_z^W)$ and $p^C = (p_x^C, p_y^C, p_z^C)$ represent the same point on the considered surface, where $p_W$ is expressed with respect to a fixed "world" reference system, and $p^C$ is expressed with respect to the standard camera reference frame (e.g., with its origin at the camera's optical center, and its $Z_C$ axis aligned with the camera's optical axis). The equation of a planar surface, expressed with respect to the camera's reference frame, is expressed in accordance with Equation 1:

$$(n^C)^T p^C + d = 0$$

where $n^C$ is a unit-norm vector normal to the plane (expressed in the camera's reference frame), and d is the distance of the plane to the camera.

Let (u,v) be the coordinates of the pixel that sees the surface point $p^C$, such that, in the absence of radial distortion induced by the camera lens, the following relationship holds, as expressed in Equation 2:

$$\begin{bmatrix} u \\ v \\ 1 \end{bmatrix} \sim K \begin{bmatrix} p_x^C \\ p_y^C \\ 1 \end{bmatrix}$$

where K is the camera's intrinsic matrix (Hartley & Zisserman, 2003), which can be estimated through offline calibration, and the symbol "~" means "equality up to a scale." Note that the camera lens' radial distortion can be modeled through offline calibration, and its effect can be removed via standard procedures.

If the "world" reference system is chosen such that its origin is contained in the plane that represents the support of a label, and its $Z_W$ axis is orthogonal to this plane, any point $p^W$ in the plane has its third coordinate, $p_z^W$, equal to 0. In this case, the following relationship holds, as expressed in Equation 3:

$$\begin{bmatrix} u \\ v \\ 1 \end{bmatrix} \sim H \begin{bmatrix} p_x^W \\ p_y^W \\ 1 \end{bmatrix}$$

where H is defined in accordance with Equation 4:

$$H = K[R_W^C r^C]_{-3}$$

In Equation 4, $R_W^C$, is the matrix representing the rotation that aligns the world reference frame with the camera reference frame, while $r^C$ is the vector joining the origin of the camera frame with the origin of the world reference frame. The subscript $_{-3}$ indicates removal of the third matrix column.

Equation 4 implies that the relationship between the $(p_x^W, p_y^W)$ coordinates of a point in the plane, and the (u,v) pixel coordinates of its projection in the camera, is an "homography" (or "collineation" see, e.g., Hartley & Zisserman, 2003). This collineation has six degrees of freedom. Note that, if the matrix H were known, it would possible to "warp" (or "rectify") the image as by Equation 5:

$$\begin{bmatrix} u' \\ v' \\ 1 \end{bmatrix} \sim H^{-1} \begin{bmatrix} u \\ v \\ 1 \end{bmatrix}$$

The rectification operation generates a new image such that the color or grayscale value at pixel (u', v') of this new, rectified image is assigned the same color or grayscale value at pixel (u,v) in the original image. If the horizontal axis $X_W$ of the world reference system is aligned with the reading axis of the text or scanline, then the rectified image would be correctly framed according to the definition of a correctly framed image, given above. The exact location of the origin of the world reference system is immaterial to the rectification process, as long as it is contained in the plane. In other words, moving the world reference system on the plane without rotating it would produce a different collineation matrix H, yet the rectification induced by $H^{-1}$ would still result in a correctly framed, rectified image.

As such, aspects of embodiments of the present invention are directed to systems and methods for computing a collineation matrix H such that $H^{-1}$ induces a rectification that is consistent with a fronto-parallel view. This will be called a fronto-parallel rectification. Note that, for a fronto-parallel rectified image, the relation between the $(p_x^W, p_y^W)$ coordinates of a point in the plane, and the (u,v) pixel coordinates of its projection, is a "similarity," which is a special type of collineation with only 4 degrees of freedom (an in-plane rotation, an image translation in two directions, and a scale factor).

Fronto-parallel rectification requires knowledge of the plane normal, $n^C = (n_x^C, n_y^C, n_z^C)$. If $n^C$ is known, the collineation defined in Equation 3 can be computed using any rotation matrix $R_W^C$ that maps the vector (0,0,1) (the $Z_W$ axis of the world reference frame) to $n^C$, together a vector $r^C$ from the camera center to any point on the plane. Formally, the matrix $R_W^C$ must be such that $[R_W^C]_3 = n^C$, where the subscript $_3$ indicates the third matrix column. For example, one could choose, in accordance with Equation 6:

$$R_W^C = [(n^C)^\perp \times n^C (n^C)^\perp n^C]$$

where $(n^C)^\perp$ is a unit-norm vector that is orthogonal to $n^C$ (e.g. $(n^C)^\perp = (0, -n_z^C, n_y^C)/\sqrt{1-(n_x^C)^2}$). A possible choice for $r^C$ could be, for example, $r^C = -\alpha n^C$, where $\alpha$ is any positive number. If the location of the label in the image is known, at least approximately, then the vector $r^C$ can be conveniently chosen such that the rectified image maintains the label in the same location. As an example, suppose that the center of the image region containing the label is at pixel $(u_0, v_0)$. Then the choice of vector in accordance with Equation 7:

$$r^C = \alpha K^{-1} \begin{bmatrix} u_0 \\ v_0 \\ 1 \end{bmatrix}$$

would ensure that the label image is still centered at $(u_0, v_0)$.

In embodiments of the present invention where the scanning system 20 captures a 3-D model of the object, the decoding system 300 rectifies views of one or more labels 18 on the object 10 by placing a virtual camera at a position that is fronto-parallel with a label and rendering a view of the 3-D model from the position of the virtual camera, thereby creating a rectified image of the label. The process can be repeated for each detected label in the 3-D model (or equivalently, for every substantially planar surface of the 3-D model) to obtain a set of candidate rectified images that potentially contain labels.

In embodiments of the present invention where the scanning system 20 includes one or more depth cameras is available in the visual information, then the plane parameters ($n^C$, d) can be inferred from a depth image (see, e.g., Henry et al., 2012). As noted above, in some embodiments of the present invention, all substantially planar portions of the depth map are extracted as potentially containing labels. In practical situations, there may be multiple such regions. For example, in the case of box-shaped object, up to three planar sides of the box can be seen by a single depth camera. Hence, planar parameters may be estimated for each of the planar surfaces. For example, in the case of a depth image that captures three different planar surfaces of a box, three different planar parameters need to be estimated, resulting in three different rectifications of the corresponding image regions (see, e.g., Gallo et al., 2011). Note that use of a depth camera enables recovery of not only the plane normal $n^C$, but also of its distance d to the camera. This information can be used to advantage if the approximate dimension of the label is known in advance. For example, if it is known that the label has a particular vertical size (in an appropriate unit such as centimeters or inches), it would be possible to directly estimate the vertical size (in pixels) of the label in the rectified image. This scale information can then be retained as an input in subsequent text or barcode reading in operation 570, as discussed in more detail below.

In some embodiments, where a depth camera is not available, and the visual data includes 2-D images of the object (e.g., captured by two or more color or grayscale 2-D cameras), the geometry of planar regions could be estimated if the two or more color or greyscale cameras are aimed such that they all see the same planar surfaces of the object. For example, in the case of two cameras that are geometrically calibrated with each other (i.e., such that the rotation and translation between the two camera reference frames is known), triangulation of matching keypoints can be used to produce a sparse set of 3-D measurements (see, e.g., Hartley & Zisserman, 2003), which can then be clustered into planar regions using standard iterative techniques such as RANSAC (see, e.g., Fischler & Bolles, 1981). Once the normal direction to each one of the visible planar surfaces has been estimated, the images can be rectified as discussed above. Geometric camera calibration generally requires an offline procedure, during which multiple pictures of a calibration pattern are taken, where the calibration pattern is placed in different locations, such that in each such location it is seen by both cameras.

Even if the cameras that see the planar surface are not geometrically calibrated with each other, it is possible to recover the plane orientation (relative to any one of the cameras) from images of the same plane taken by the cameras. Simple geometry shows that images of the same planar surface taken by two cameras in different poses are related to each other by a collineation. The collineation matrix can be estimated using standard methods (e.g., Direct Linear Transformation; Hartley & Zisserman, 2003) from keypoints matched across images. It is then possible to decompose the collineation matrix thus found to estimate the plane orientation (see, e.g., Malis & Vargas, 2007). This information can then be used to rectify the images as explained earlier. If multiple planes are visible in the image, a "segmentation" procedure must be performed to identify areas in the two images that are the projection of the same planar surfaces. Specifically, segmentation finds regions in the two images such that a region in one image is consistent with a collineation-induced warping of the corresponding region in the other image (see, e.g., Vincent & Leganiere, 2001). Standard iterative segmentation methods can be used for this purpose (see, e.g., Kim et al., 2018).

In some embodiments, where only one camera is available, image rectification is still possible under certain conditions where certain assumptions are made. In many cases, some prior information about the orientation of the label-carrying surfaces is available. For example, in the common case where the object has a cuboid shape (e.g., a rectangular box) with one face lying on the ground plane (the load-bearing horizontal surface such as a conveyor belt 12), the top surface of the box will be parallel to the ground plane (horizontal), while the other surfaces will be vertical. This information can be used to advantage if the orientation of the camera with respect to the ground plane is known (more specifically, if the direction of the normal to the ground plane, $g^C$, with respect to the camera's reference frame is known). This could be obtained, for example, through prior calibration of a fixed camera using a planar calibration pattern placed on the ground plane. In some embodiments, a 3-axis accelerometer 118 is rigidly attached to the camera, where the orientation of the mutually orthogonal accelerometer axes has been properly calibrated with the camera's reference frame. When the accelerometer 118 (e.g., the camera 100) is not moved, or is moved with linear constant velocity, the measurements from the three accelerometers form the components of the vector $g^C$. The advantage of using a 3-axis accelerometer for this purpose is that the camera orientation (more precisely, its roll and pitch angles, which can be obtained from proper decomposition of the measured vector $g^C$) can be tracked in real-time while the camera is being moved by continuously reading of the accelerometer's output. Thus, this technique is very convenient in the case, for example, of a hand-held scanning system 20 (e.g., a scanning system 20 that is lightweight and portable and that can easily be held and carried in human hands during operation, such as a device the size of a smartphone or digital camera).

Measurement of the direction $g^C$ normal to the ground plane can be used to rectify the image of the horizontal surface of a cuboid-shaped box because this surface, as mentioned earlier, is parallel to the ground plane (and therefore its normal is aligned with $g^C$). For the visible vertical surfaces of the box, only partial information about their orientation is available. Specifically, it can only be known that the plane normal $n^C$ of either of the two visible vertical surfaces is orthogonal to the measured $g^C$. In some embodiments, the decoding system 300 recovers the remaining degree of freedom (specifically, the azimuth angle of the vertical surface's normal) from image analysis (e.g., from the location of the vanishing points formed by the images of the edges of the vertical box face; see, e.g., Weiss et al., 1990) or through machine learning techniques (see, e.g., Haines & Calway, 2015). In some embodiments of the present invention, the decoding system 300 samples the azimuth angle over a set of candidate azimuth values, producing a set of "test" collineations that can be used to rectify the image. The original image is then rectified based on each of these test or candidate collineations to generate candidate rectified images (e.g., potential rectifications of the captured perspective-distorted image).

As such, aspects of embodiments of the present invention are directed to methods for generating candidate rectified images of labels of an object, where the candidate rectified images may be generated from a 3-D model captured by a 3-D scanning system by rendering views of the 3-D model from a virtual camera placed at poses that are fronto-parallel to the planar surfaces of the 3-D model that may contain labels. In the case of a depth image captured from a single pose, candidate rectified images can be computed by identifying substantially planar surfaces and computing the plane parameters for each of the planar surfaces in order to determine a transformation between the planar surfaces and a fronto-parallel orientation, as discussed above. In the case of 2-D images captured from a plurality of calibrated 2-D cameras, the positions and orientations of the planar surfaces of the object are determined from the images by performing keypoint based matching between the images captured by the different cameras. In some embodiments, where only one camera is available (e.g., in the case of a handheld scanning device such as a smartphone), prior information about the shapes of objects is used to perform detection of the planes of the objects, including the common case where the object is a cuboid in shape (e.g., in the case of most boxes and packages) and based on accelerometer data to detect the orientation of the camera with respect to gravity, and an assumption that the visible surfaces of the object are either perpendicular to gravity (the top surface) or parallel to gravity (the side surfaces of the cuboid).

In some embodiments of the present invention, the labels may be rotated within the rectified images. For example, a label printed on a box may be rotated 90 degrees, 180 degrees, or 270 degrees from the rectified direction (e.g., if the images of the box are captured with the box is on its side). In some embodiments, all four potential rotations of the rectified image of the label are provided as candidates. As another example, an adhesive label may be attached at an arbitrary angle with respect to the edges of a package. Accordingly, in some embodiments of the present invention, an appropriate line detection algorithm (e.g., a Hough transform or a convolution-based technique) is applied to the images of the labels in order to detect potential rotation angles for straightening the images. For example, line detection may be used to detect the edges of the adhesively attached label and to straighten the label such that the reading axis of its contents are substantially aligned with the horizontal axis of the rectified image.

Detecting Content from Rectified Images of Labels

As noted above, in some embodiments of the present invention, multiple test rectifications of the images are performed, such that some of the resulting images are rectified (e.g., converted to fronto-parallel view), and text or barcode reading is attempted in operation 570 for each of the rectified images.

As discussed above, existing optical character recognition (OCR) technologies for detecting and recognizing text content of images are robust and well-developed if the images of the text are captured in a fronto-parallel view. As such, supplying the candidate rectified images to an OCR algorithm will result in a plurality of potential text recognition outputs, some of which may have higher accuracy or higher confidence than others (e.g., in accordance with whether the supplied candidate rectified image included text having a reading axis aligned with the horizontal axis of the candidate rectified image). Accordingly, in some embodiments, the text from the highest confidence rotations from among the candidate rectified images of the planar surfaces of the objects are output as the recognized text.

Likewise, the candidate rectified images of the planar surfaces of the object are supplied to barcode reading algorithms (e.g., linear and 2-D barcode) to detect and decode barcodes contained therein. Accordingly, in some embodiments, the outputs of the barcode reading algorithms, corresponding to the decoded data contained in the barcodes, are also output as the decoded barcodes.

As additional examples, some embodiments of the present invention are directed to detecting icons within the rectified images, such as detecting standard warning icons, such as regarding fragility, biological or radiological hazards, temperature limits, handle with care, rain and moisture sensitivity, recyclability (e.g., plastic contents) and the like, of items contained therein. In some embodiments of the present invention, a convolutional neural network is trained to detect the presence of various icons and classify the icons. Accordingly, in some embodiments, the outputs of the icon detection and classification algorithms are also output as the content of decoded icons within the rectified images.

While embodiments of the present invention are described herein with respect to the use of text recognition, barcode decoding, and icon recognition algorithms, embodiments of the present invention are not limited thereto and can also be applied to other decoding algorithms for recognizing the contents of labels affixed to objects.

In operation 590, the results of the various decoding techniques are output, for example, to a user device 400 for display to an end user and/or control of electromechanical devices, such as a conveyor system of a manufacturing or logistics facility.

Various computational portions of embodiments of the present invention, including the decoding system 300, may be implemented through purpose-specific computer instructions executed by a computer system. The computer system may include one or more processors, including one or more central processing units (CPUs), one or more graphics processing units (GPUs), one or more field programmable gate arrays (FPGAs), one or more digital signal processors (DSPs), and/or one or more application specific integrated circuits (ASICs) such as neuromorphic processors and other processing units configured to implement neural networks such as "tensor processing units" (TPUs), vector processors, and the like. The computer system may also include peripherals such as communications devices (e.g., network adapters, serial or parallel data bus adapters, graphics adapters) for transmitting and/or receiving data to and from other devices such as 3-D scanning systems, data storage systems (e.g., databases), display devices, and other computer systems. The computations may be distributed across multiple separate computer systems, some of which may be local to the scanning of the query objects (e.g., on-site and connected directly to the depth and color cameras, or connected to the depth and color cameras over a local area network), and some of which may be remote (e.g., off-site, "cloud" based computing resources connected to the depth and color cameras through a wide area network such as the Internet).

In some embodiments of the present invention, the processing is performed at the camera (e.g., in one or more processors and memory of the scanners 100), and object analysis results (e.g., decoded content of the labels) may be computed by the scanners 100. In some embodiments of the present invention, the individual outputs of the different scanners (e.g., the different visual information) may be combined together and analyzed together to show the decoded content of labels detected across all visible surfaces of the object. In some embodiments of the present invention, a group of cameras may share one or more local processors to compute label detection and decoding results based on the images captured by the different scanners 100 of the group. In some embodiments of the present invention, by performing the data analysis locally, the amount of data transferred over a network is reduced (e.g., transmitting decoding results is generally less bandwidth intensive than transmitting depth maps or 3-D models), thereby allowing for a greater number of cameras to be distributed throughout an environment without requiring a large investment in networking equipment to provide sufficient bandwidth. Some considerations and systems for distributing a computation between a local processing device and a remote (or "offline") processing device are described, for example, in U.S. patent application Ser. No. 15/805,107 "SYSTEM AND METHOD FOR PORTABLE ACTIVE 3D SCANNING," filed in the United States Patent and Trademark Office on Nov. 6, 2017, the entire disclosure of which is incorporated by reference herein.

For the sake of convenience, the computer systems configured using particular computer instructions to perform purpose specific operations for inspecting target objects based on captured images of the target objects are referred to herein as parts of inspection agents or inspection systems.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for automatically recognizing content of labels on objects, comprising:
  capturing visual information of an object using a scanning system comprising one or more cameras, the object having one or more labels on one or more exterior surfaces, wherein:
    at least one camera of the one or more cameras is a depth camera, and
    wherein the visual information of the object comprises a 3-D model;
  detecting, by a computing system, one or more surfaces of the object having labels;
  rectifying, by the computing system, the visual information of the one or more surfaces of the object to compute one or more rectified images, wherein rectifying the visual information comprises:
    estimating, by the computing system, an orientation of each of the one or more surfaces with respect to the scanning system based on the visual information, wherein estimating the orientation of the one or more labels comprises detecting a substantially planar surface of the 3-D model,
  computing, by the computing system, for each surface of the one or more surfaces, a transformation matrix between the orientation of each surface and a fronto-parallel orientation with respect to the scanning system, wherein computing the transformation matrix comprises computing a transformation of a virtual camera to the fronto-parallel orientation with respect to the substantially planar surface, and
  transforming, by the computing system, at least a portion of the visual information of the object corresponding to each surface of the one or more surfaces with respect to the transformation matrix to compute a rectified image of each surface of the one or more surfaces, wherein the rectified image of the one or more labels is computed by rendering a view of the substantially planar surface of the 3-D model from the fronto-parallel orientation; and
  decoding, by the computing system, content of a label depicted in at least one of the one or more rectified images.

2. The method of claim 1, wherein the label comprises a barcode, and wherein the decoding the content of the label comprises supplying the rectified image of the label to a barcode recognition algorithm.

3. The method of claim 2, wherein the barcode is a linear barcode.

4. The method of claim 2, wherein the barcode is a 2-D bar code.

5. The method of claim 1, wherein the label comprises text, and wherein the decoding the content of the label comprises supplying the rectified image of the label to an optical character recognition (OCR) algorithm.

6. The method of claim 1, wherein the label comprises an icon, and wherein the decoding the content of the label comprises supplying the rectified image of the label to an icon detection algorithm.

7. The method of claim 1, wherein at least one camera of the one or more cameras is a depth camera, and wherein the visual information comprises a depth map of the object.

8. The method of claim 7, wherein the estimating the orientation comprises detecting a substantially planar shape of the label in the depth map, and wherein the computing the transformation matrix comprises computing a transformation between the substantially planar shape of the label in the depth map and the fronto-parallel orientation.

9. The method of claim 7, wherein each depth camera of the scanning system comprises:
  a time-of-flight depth camera;
  a structured light depth camera;
  a stereo depth camera comprising:
    at least two color cameras;
  a stereo depth camera comprising:
    at least two color cameras; and
    a color projector;
  a stereo depth camera comprising:
    at least two infrared cameras;
  a stereo depth camera comprising:
    at least two infrared cameras;
    an infrared projector; and
    a color camera; or
  a stereo depth camera comprising:
    at least two RGB-IR cameras; and an infrared projector.

10. The method of claim 7, wherein the scanning system further comprises one or more 2-D cameras.

11. The method of claim 1, wherein the scanning system further comprises one or more 2-D cameras.

12. The method of claim 1, wherein at least one camera of the one or more cameras is a 2-D camera and the scanning system comprises an accelerometer rigidly attached to the 2-D camera,
wherein the visual information comprises at least one 2-D image captured by the 2-D camera and accelerometer data associated with an orientation of the 2-D camera when the at least one 2-D image was captured, wherein the object is supported by a ground plane, and wherein the object has a cuboidal shape comprising a horizontal surface parallel to the ground plane and at least one vertical surface perpendicular to the ground plane.

13. The method of claim 12, wherein the estimating the orientation of the label comprises:
detecting the horizontal surface and the at least one vertical surface of the object;
measuring a direction normal to the ground plane based on the accelerometer data; and
sampling an azimuth angle of the normal of the at least one vertical surface over a plurality of candidate azimuth values, and wherein the computing the transformation matrix comprises computing a plurality of transformation matrices corresponding to the plurality of candidate azimuth values.

14. The method of claim 12, wherein the scanning system further comprises one or more depth cameras.

15. The method of claim 1, wherein the one or more cameras of the scanning system comprise a plurality of 2-D cameras, wherein the visual information comprises a first 2-D image captured by a first 2-D camera of the plurality of 2-D cameras, the first 2-D camera having a first pose with respect to the object, wherein the visual information comprises a second 2-D image captured by a second 2-D camera of the plurality of 2-D cameras, the second 2-D camera having a second pose with respect to the object, the second pose being different than the first pose of the first 2-D camera, the second 2-D camera being calibrated with the first 2-D camera, wherein one or more planar surfaces of the object are depicted by both the first 2-D image captured by the first 2-D camera and the second 2-D image captured by the second 2-D camera, and wherein the estimating the orientation of each of the one or more surfaces comprises triangulating a normal direction to each of the one or more surfaces of the object based on the first 2-D image captured by the first 2-D camera and the second 2-D image captured by the second 2-D camera.

16. A system for decoding content of labels on objects comprising:
a scanning system comprising one or more cameras; and
a computing system connected to the scanning system, the computing system comprising a processor and memory storing instructions that, when executed by the processor, cause the processor to:
control the scanning system to capture visual information of an object, the object having one or more labels on one or more exterior surfaces; detect one or more surfaces of the object depicting labels, wherein:
at least one camera of the one or more cameras is a depth camera, and
wherein the visual information of the object comprises a 3-D model;
rectify the visual information of the one or more surfaces of the object to compute one or more rectified images, wherein rectifying the visual information comprises:
estimating, by the computing system, an orientation of each of the one or more surfaces with respect to the scanning system based on the visual information, wherein estimating the orientation of the one or more labels comprises detecting a substantially planar surface of the 3-D model,
computing, by the computing system, for each surface of the one or more surfaces, a transformation matrix between the orientation of each surface and a fronto-parallel orientation with respect to the scanning system, wherein computing the transformation matrix comprises computing a transformation of a virtual camera to the fronto-parallel orientation with respect to the substantially planar surface, and
transforming, by the computing system, at least a portion of the visual information of the object corresponding to each surface of the one or more surfaces with respect to the transformation matrix to compute a rectified image of each surface of the one or more surfaces, wherein the rectified image of the one or more labels is computed by rendering a view of the substantially planar surface of the 3-D model from the fronto-parallel orientation; and
decode content of a label depicted in at least one of the one or more rectified images.

17. The system of claim 16, wherein the label comprises a barcode, and wherein the decoding the content of the label comprises supplying the rectified image of the label to a barcode recognition algorithm.

18. The system of claim 16, wherein the label comprises text, and
wherein the decoding the content of the label comprises supplying the rectified image of the label to an optical character recognition (OCR) algorithm.

19. The system of claim 16 wherein the instructions to rectify the visual information comprises instructions that, when executed by the processor, cause the processor to:
estimate an orientation of each of the one or more surfaces with respect to the scanning system based on the visual information; compute, for each surface of the one or more surfaces, a transformation matrix between the orientation of each surface and a fronto-parallel orientation with respect to the scanning system; and transform at least a portion of the visual information of the object corresponding to each surface of the one or more surfaces with respect to the transformation matrix to compute a rectified image of each surface of the one or more surfaces.

20. The system of claim 19, wherein the one or more cameras comprise at least one depth camera, wherein the visual information of the object comprises a depth map, wherein the instructions to estimate the orientation of each of the one or more surfaces comprise instructions that, when executed by the processor, cause the processor to detect a substantially planar shape of the label in the depth map, and
wherein the instructions to compute the transformation matrix comprise instructions that, when executed by the processor, cause the processor to compute a transformation between the substantially planar shape of the label and the fronto-parallel orientation.

* * * * *